(12) United States Patent
Jang

(10) Patent No.: US 12,231,770 B2
(45) Date of Patent: Feb. 18, 2025

(54) CAMERA ACTUATOR AND CAMERA MODULE INCLUDING THE SAME

(71) Applicant: LG INNOTEK CO., LTD., Seoul (KR)

(72) Inventor: Young Bae Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 192 days.

(21) Appl. No.: 17/626,250

(22) PCT Filed: Jul. 7, 2020

(86) PCT No.: PCT/KR2020/008865
§ 371 (c)(1),
(2) Date: Jan. 11, 2022

(87) PCT Pub. No.: WO2021/010640
PCT Pub. Date: Jan. 21, 2021

(65) Prior Publication Data
US 2022/0279125 A1  Sep. 1, 2022

(30) Foreign Application Priority Data

Jul. 12, 2019  (KR) .......................... 10-2019-0084504

(51) Int. Cl.
| | | |
|---|---|---|
| *H04N 23/68* | (2023.01) | |
| *G02B 27/64* | (2006.01) | |
| *H04N 23/54* | (2023.01) | |
| *H04N 23/55* | (2023.01) | |

(52) U.S. Cl.
CPC ........... *H04N 23/686* (2023.01); *H04N 23/54* (2023.01); *H04N 23/55* (2023.01); *G02B 27/646* (2013.01)

(58) Field of Classification Search
CPC .......... G02B 7/09; G02B 27/646; G02B 7/08; G03B 13/36; H04N 5/2253; H04N 5/2258; H04N 5/23258; H04N 5/23287
See application file for complete search history.

(56) References Cited

U.S. PATENT DOCUMENTS

| | | |
|---|---|---|
| 8,208,060 B2 | 6/2012 | Lim |
| 10,133,152 B2 | 11/2018 | Kang et al. |
| 10,334,146 B2 | 6/2019 | Im et al. |
| 10,394,046 B2 | 8/2019 | Jeong et al. |
| 10,594,911 B2 | 3/2020 | Im et al. |
| 11,277,550 B2 | 3/2022 | Im et al. |
| 2009/0153726 A1 | 6/2009 | Lim |

(Continued)

FOREIGN PATENT DOCUMENTS

| | | |
|---|---|---|
| CN | 109143528 A | 1/2019 |
| KR | 10-2009-0062472 A | 6/2009 |

(Continued)

*Primary Examiner* — Xi Wang
(74) *Attorney, Agent, or Firm* — Birch, Stewart, Kolasch & Birch, LLP

(57) ABSTRACT

Embodiments relate to a camera actuator and a camera module having the same. The camera actuator according to embodiments may have an integrated base; a first camera actuator disposed in a first area of the integrated base and a second camera actuator disposed in a second area of the integrated base. The integrated base may have a first base body; a second base body and a third base body disposed between the first base body and the second base body.

18 Claims, 23 Drawing Sheets

(56) References Cited

U.S. PATENT DOCUMENTS

| | | | |
|---|---|---|---|
| 2017/0324906 A1* | 11/2017 | Kang | H04N 23/6812 |
| 2018/0024329 A1 | 1/2018 | Goldenberg et al. | |
| 2018/0299651 A1* | 10/2018 | Yu | H02K 41/0354 |
| 2018/0367714 A1 | 12/2018 | Im et al. | |
| 2019/0104239 A1 | 4/2019 | Aschwanden et al. | |
| 2019/0268515 A1 | 8/2019 | Im et al. | |
| 2019/0361323 A1 | 11/2019 | Jerby et al. | |
| 2020/0177778 A1 | 6/2020 | Im et al. | |
| 2022/0159155 A1 | 5/2022 | Im et al. | |

FOREIGN PATENT DOCUMENTS

| | | |
|---|---|---|
| KR | 10-1742500 B1 | 6/2017 |
| KR | 10-2018-0085460 A | 7/2018 |
| KR | 10-2018-0097228 A | 8/2018 |
| KR | 10-1892857 B1 | 8/2018 |
| KR | 10-2018-0118720 A | 10/2018 |
| KR | 10-2018-0137277 A | 12/2018 |
| WO | WO 2018/130898 A1 | 7/2018 |

\* cited by examiner

[Fig. 1a]
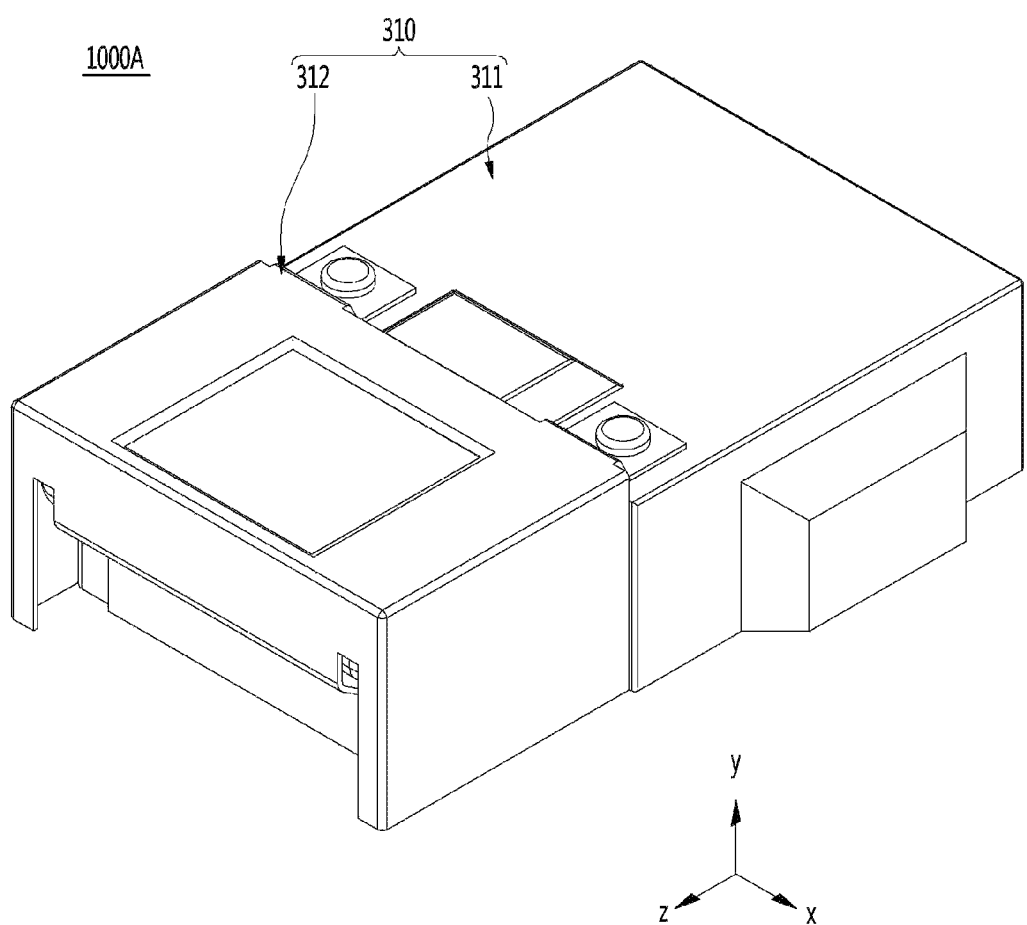

【Fig. 1b】
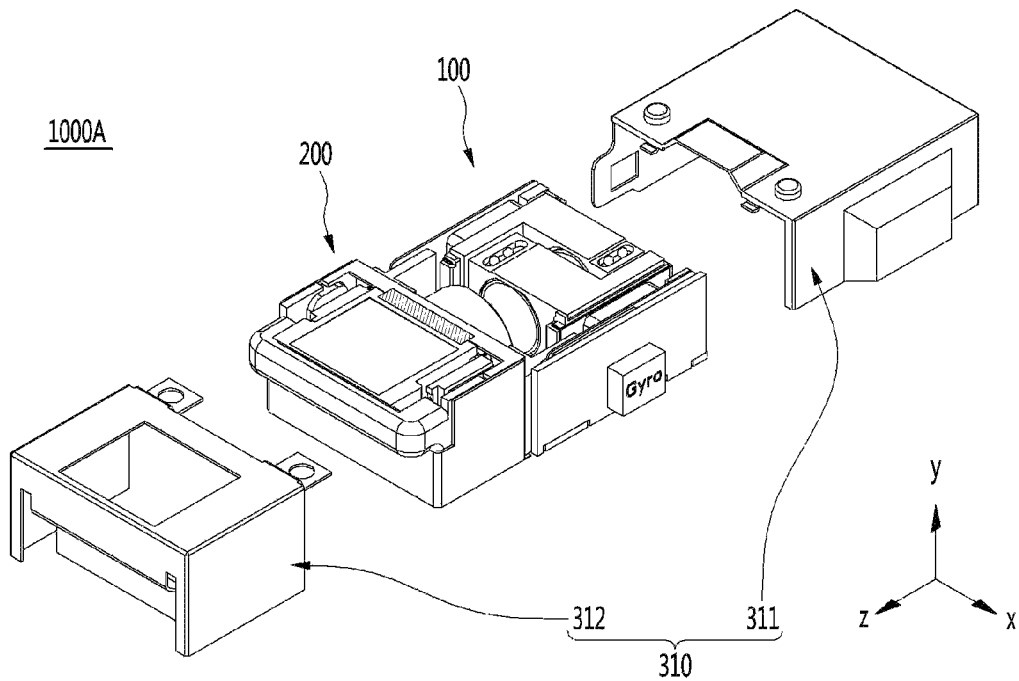
【Fig. 2a】
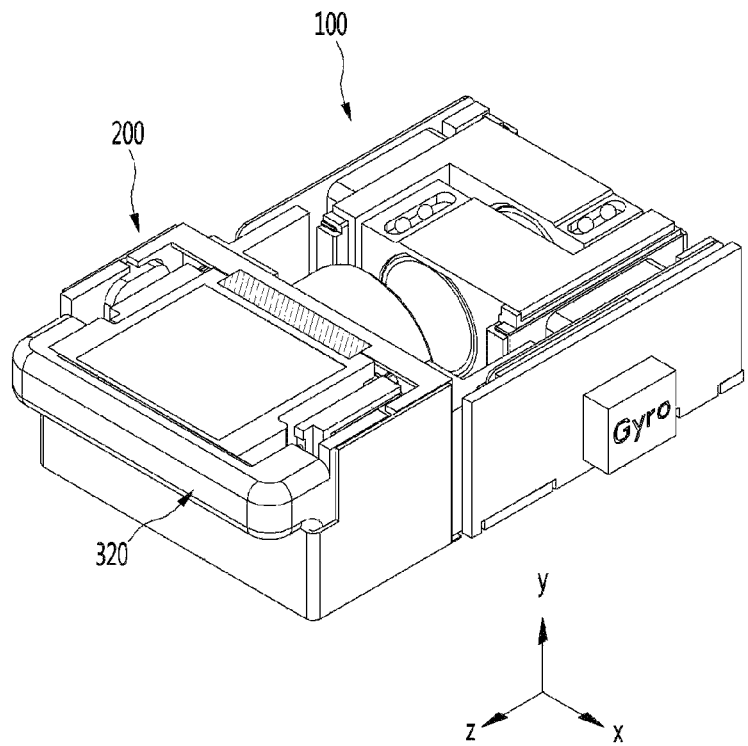

【Fig. 2b】
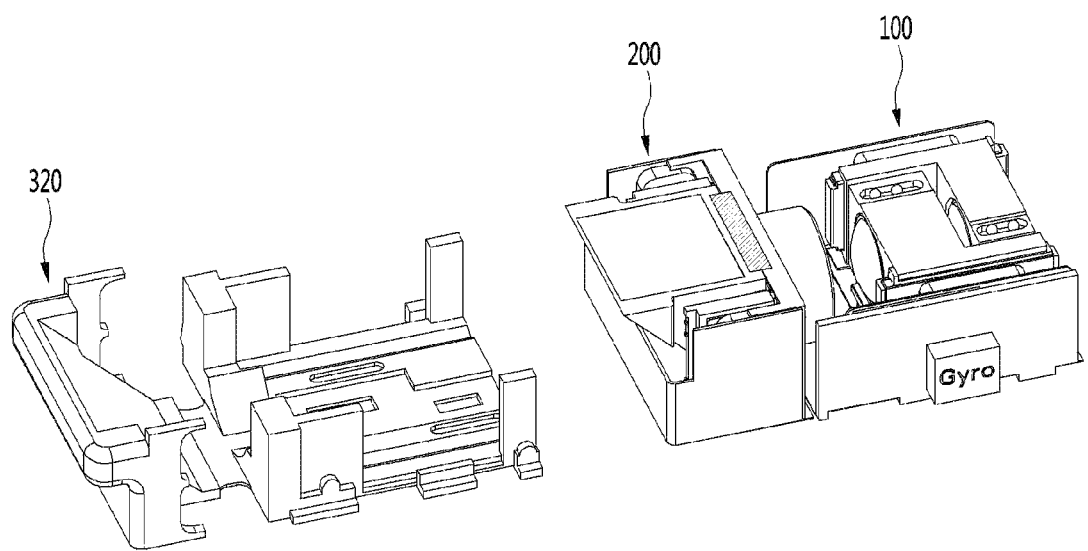

[FIG. 3]
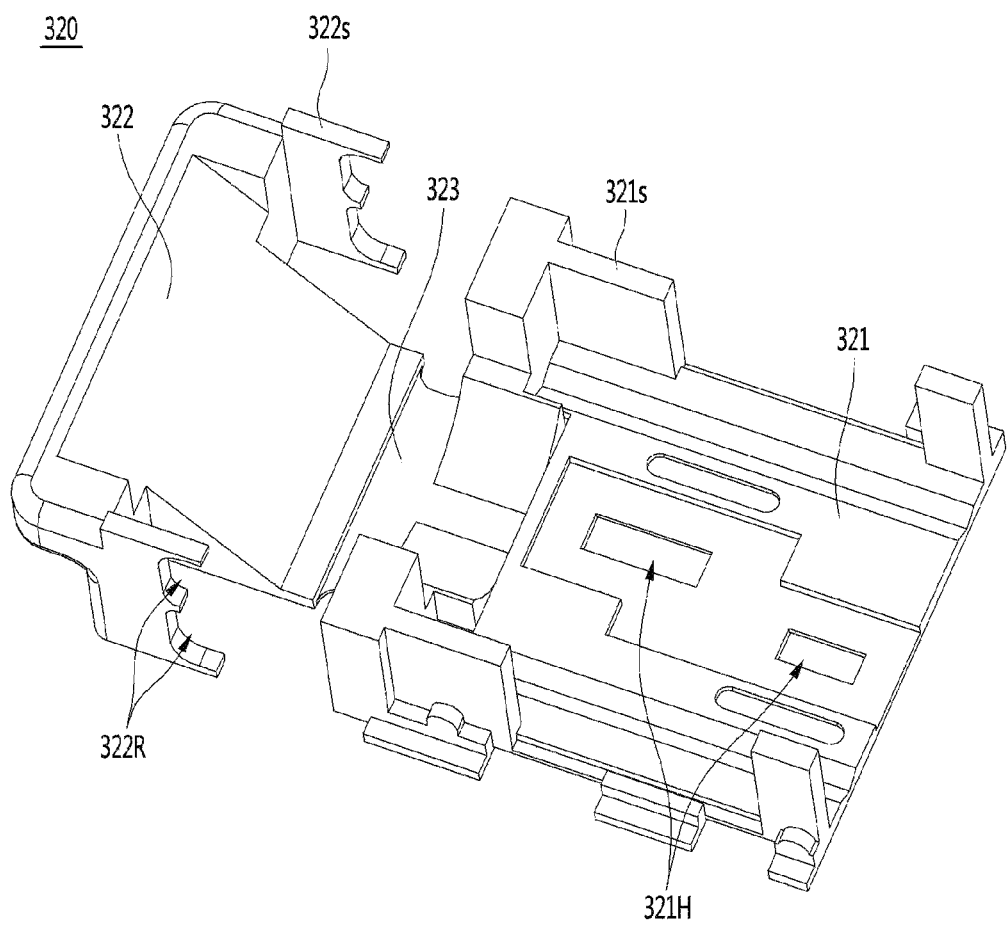

【Fig. 4a】
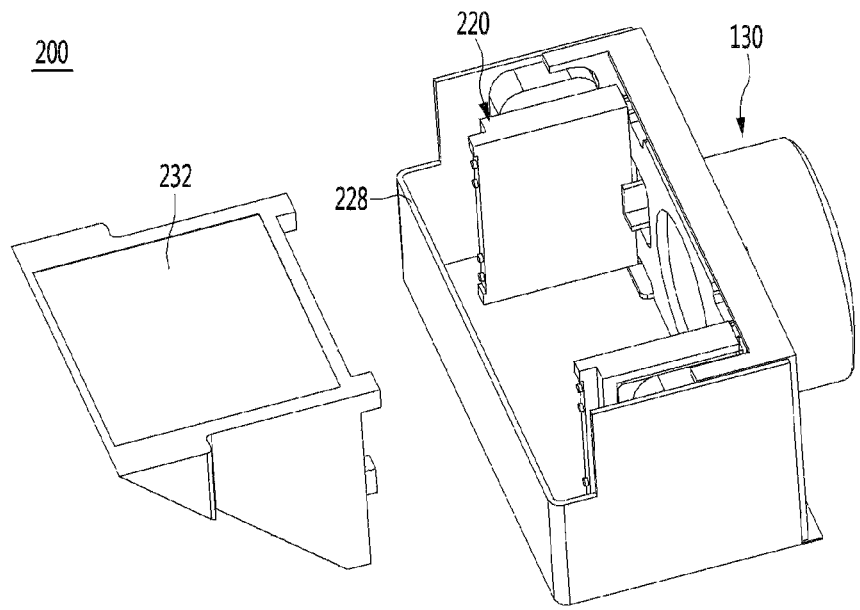
【Fig. 4b】
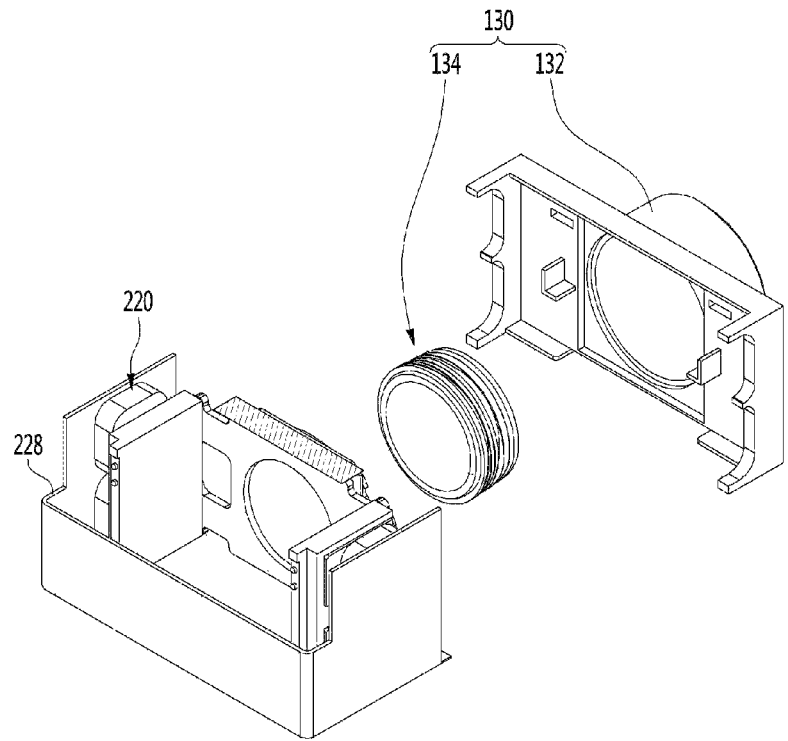

[FIG. 5]
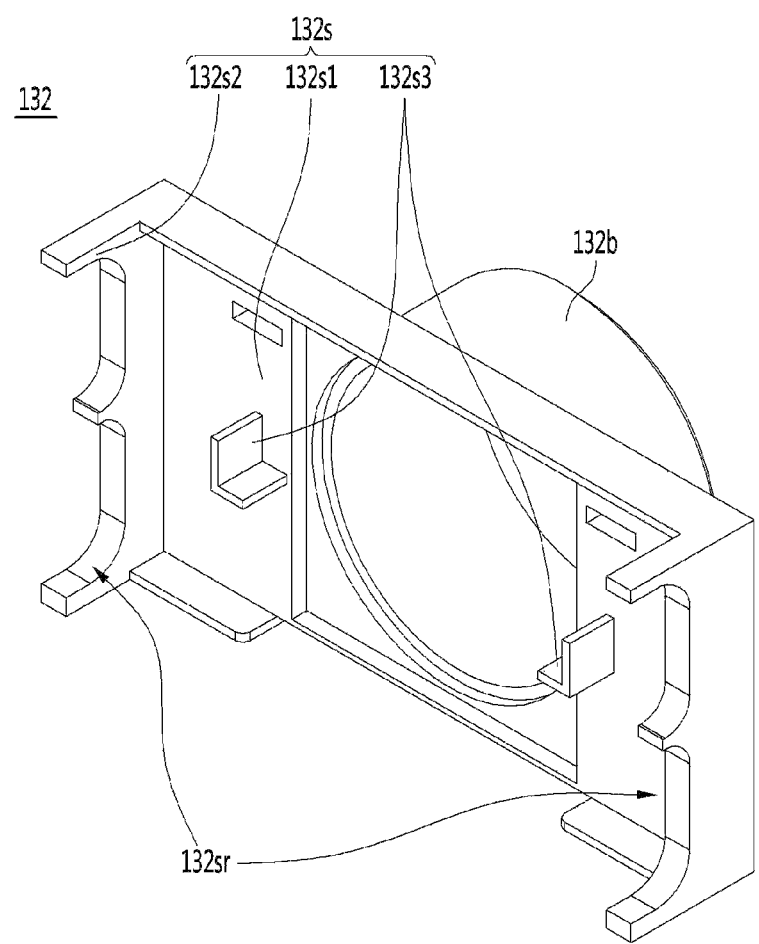

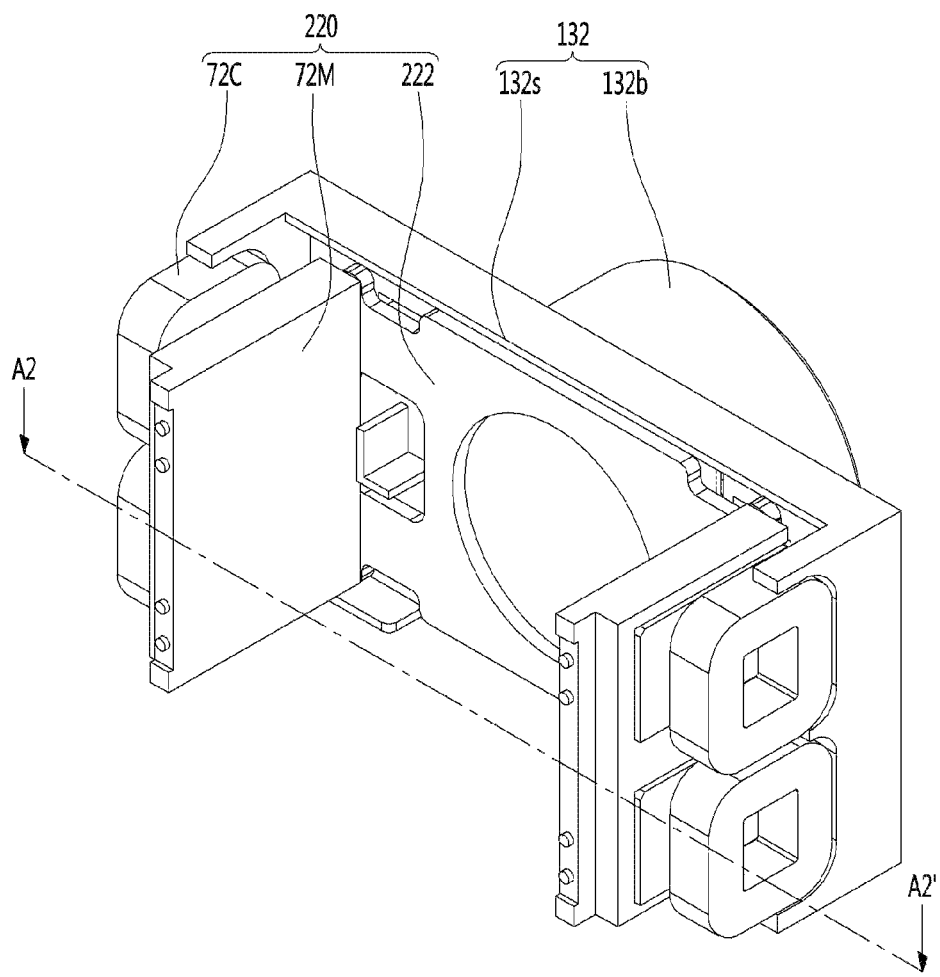
[Fig. 6a]

[Fig. 6b]
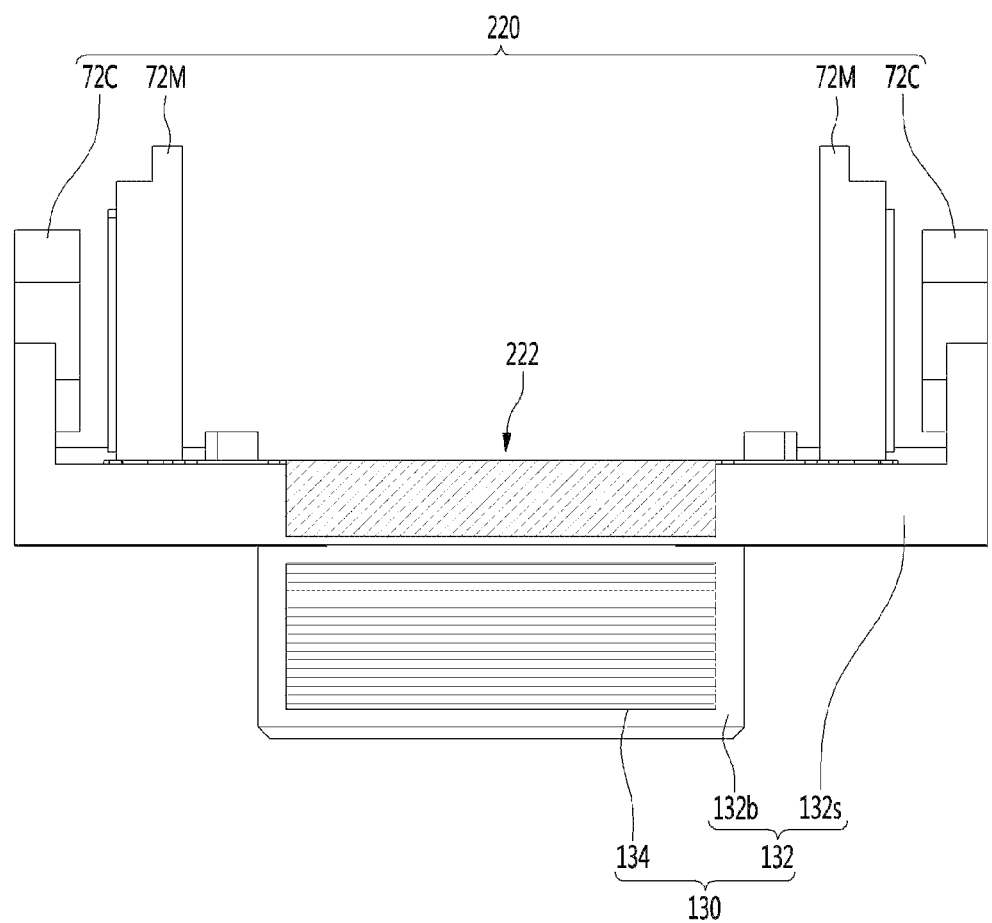

[FIG. 7]
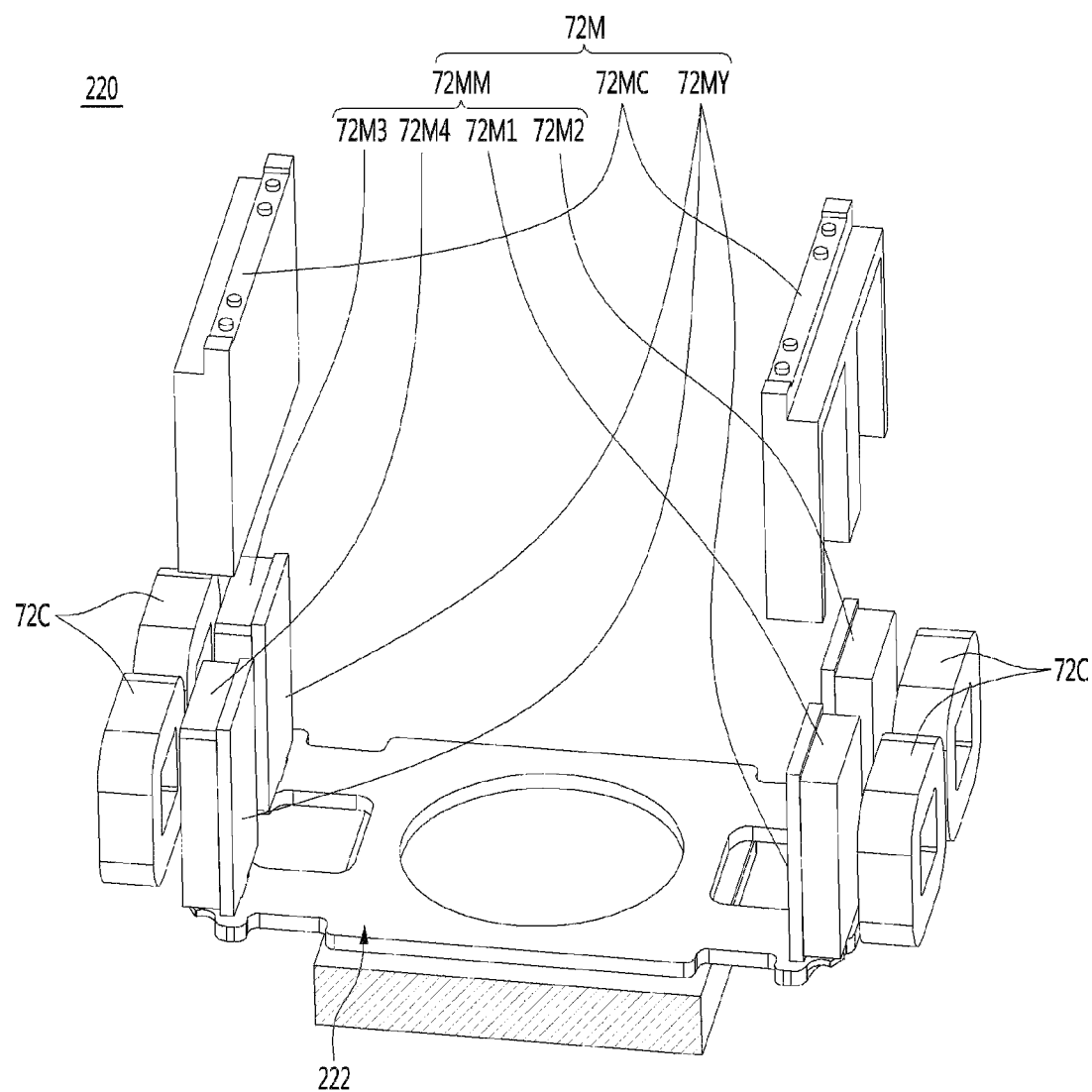

[FIG. 8]
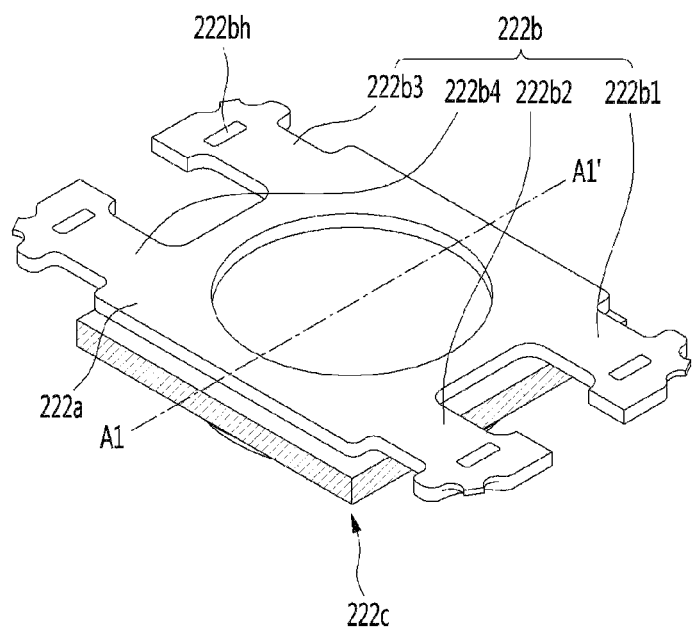
[FIG. 9]
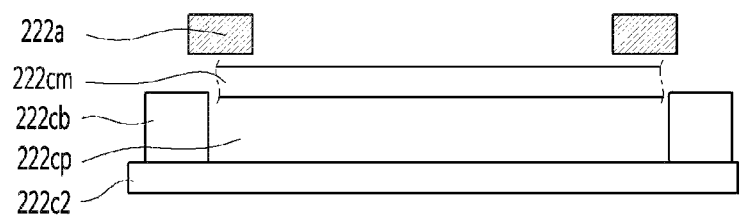

[Fig. 10a]
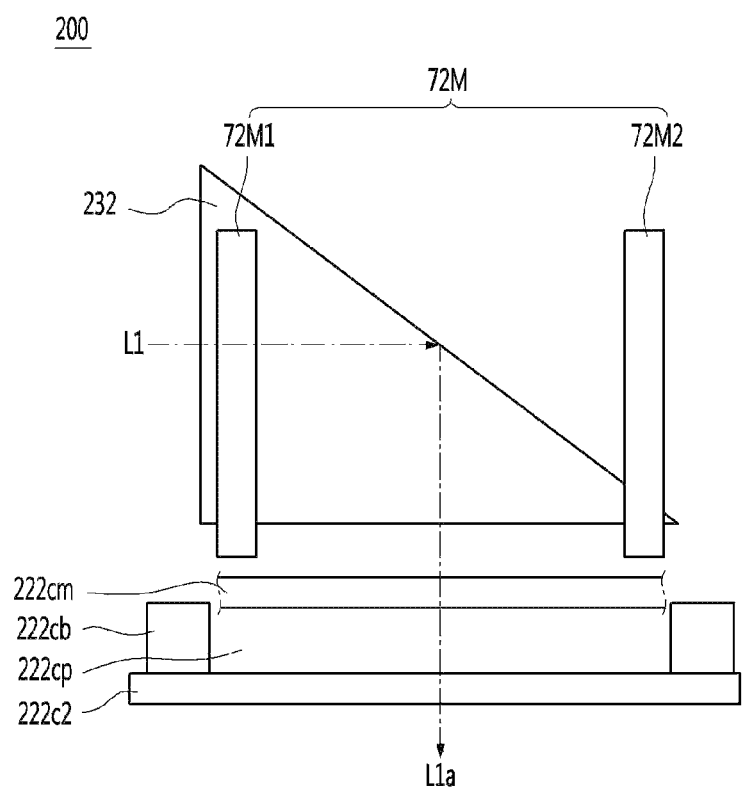

[Fig. 10b]
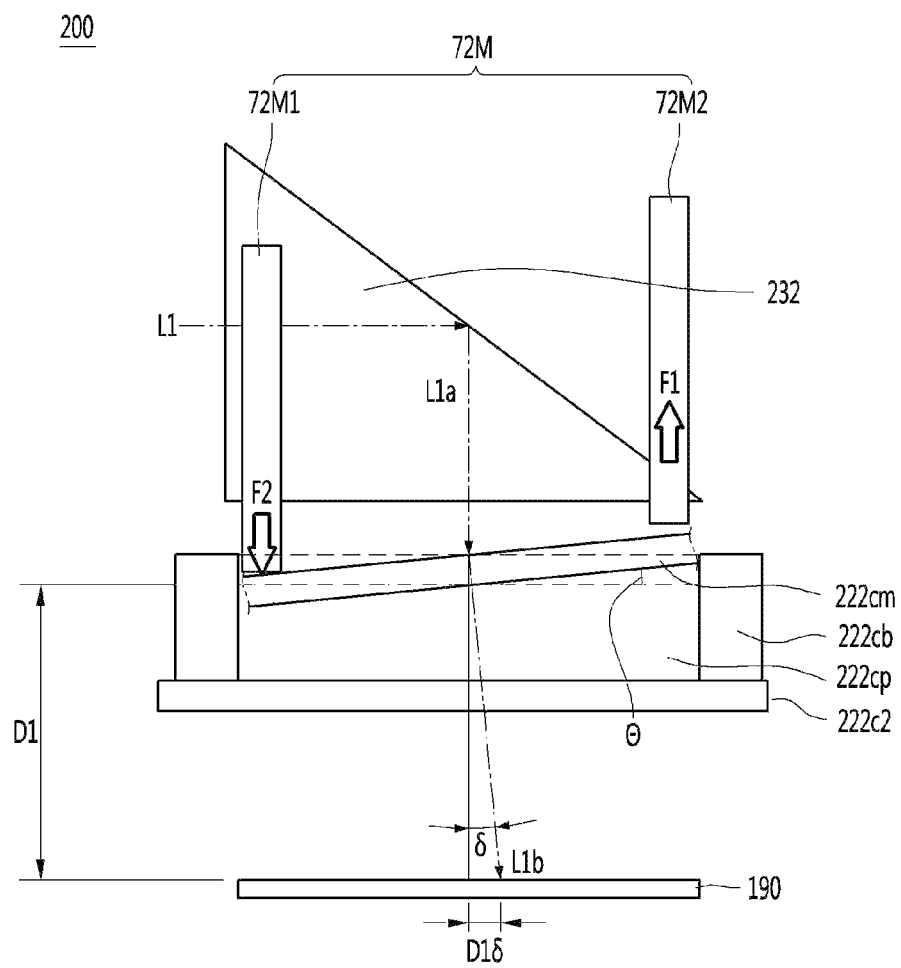

[FIG. 11]
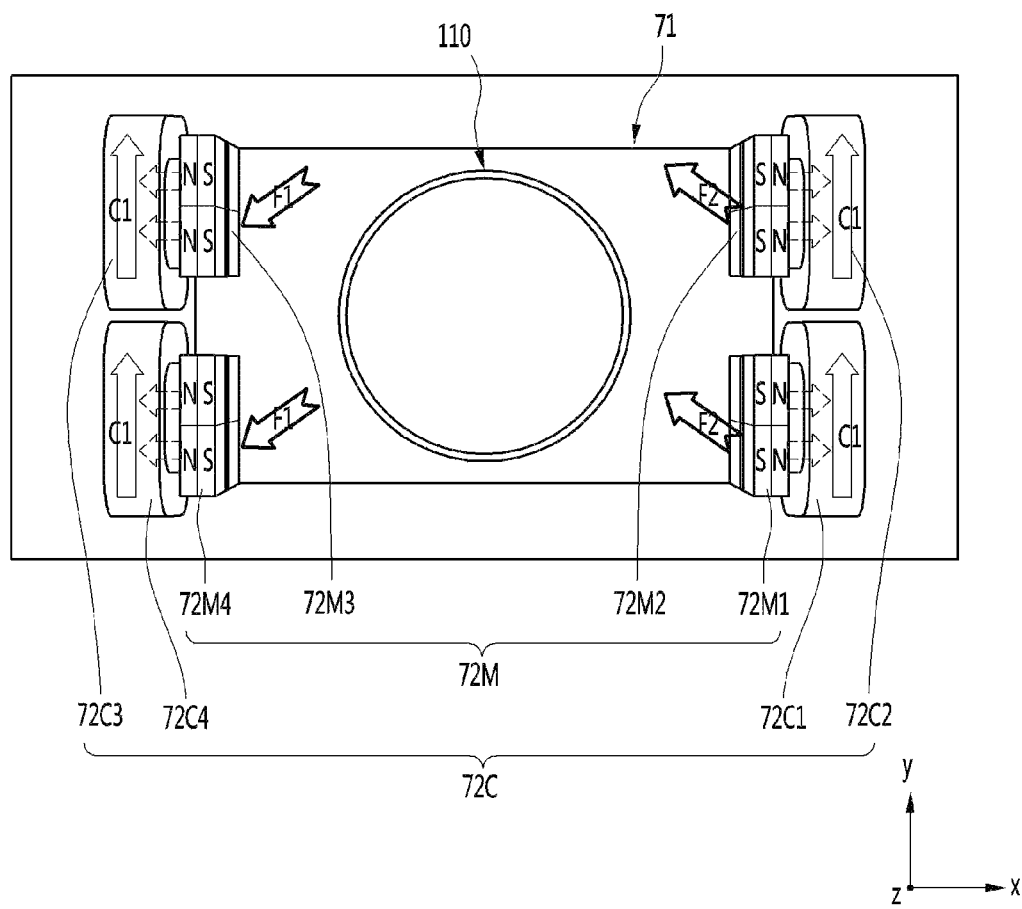

[FIG. 12]
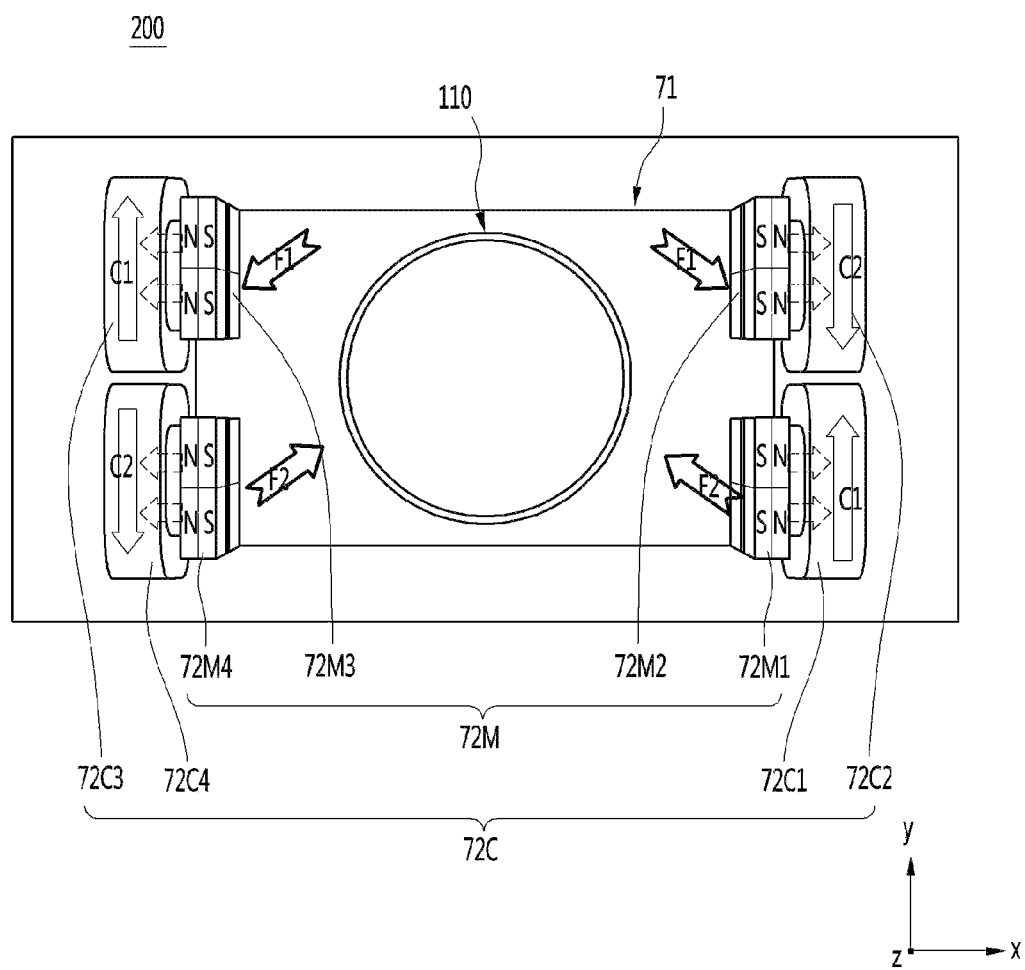

[FIG. 13]
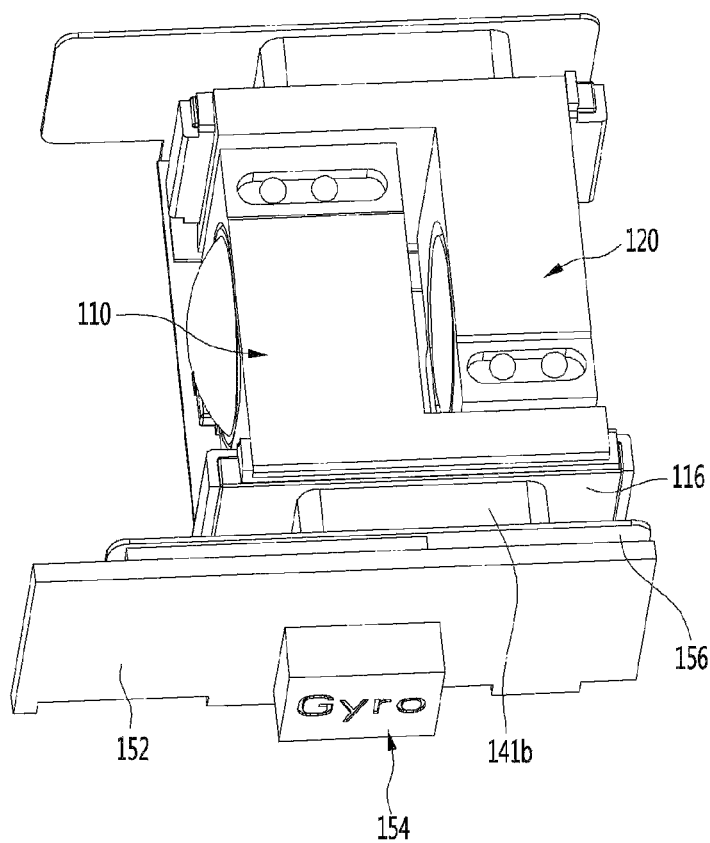

[FIG. 14]
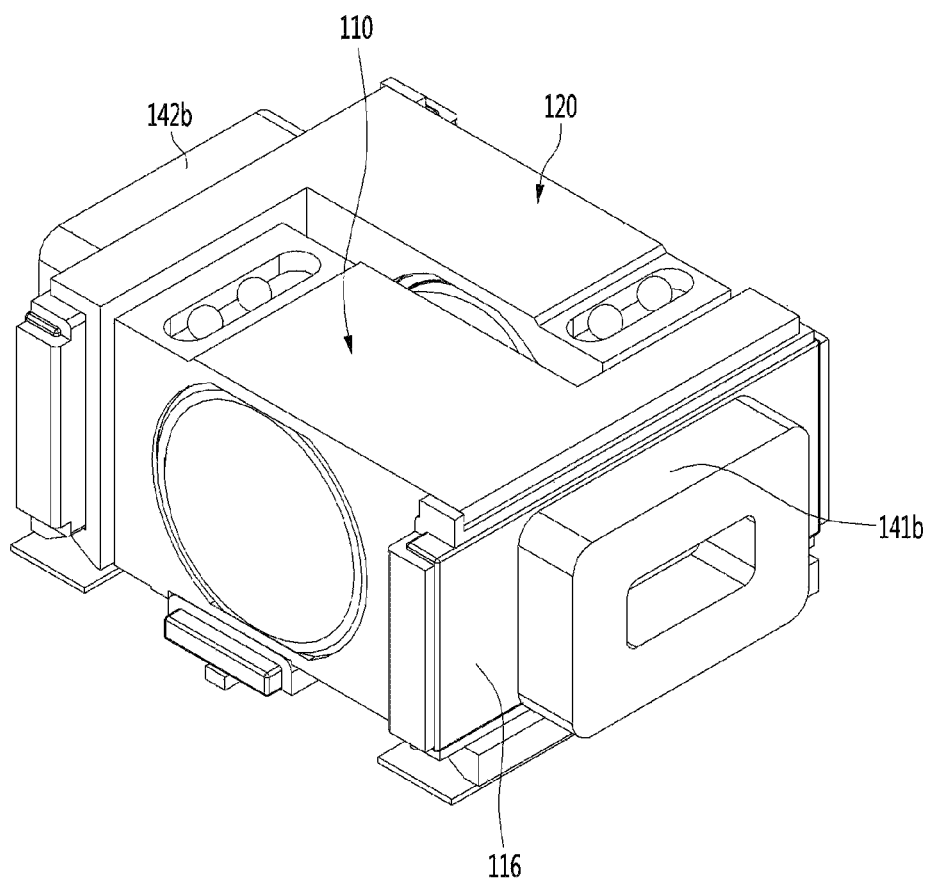

[FIG. 15]
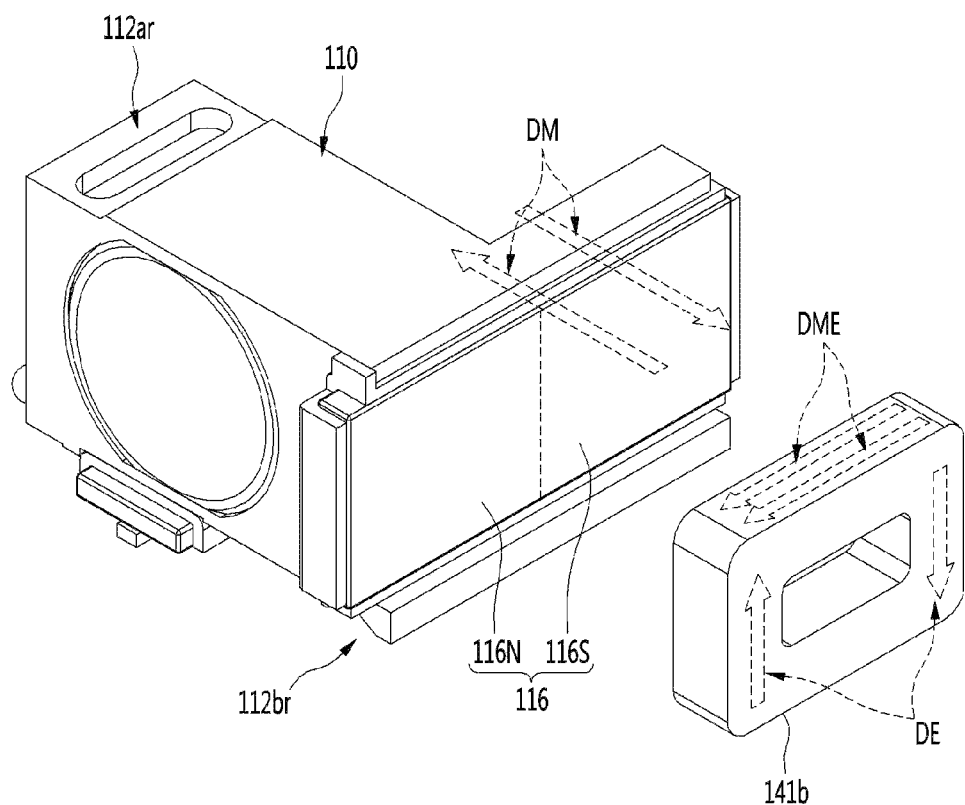

[FIG. 16]
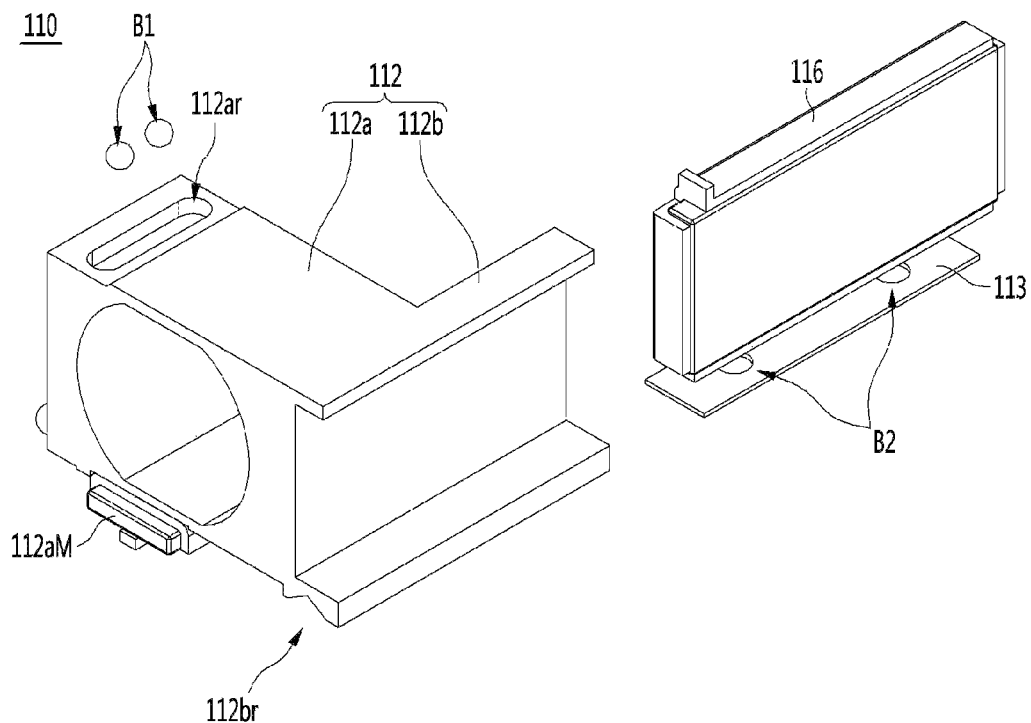
[Fig. 17a]
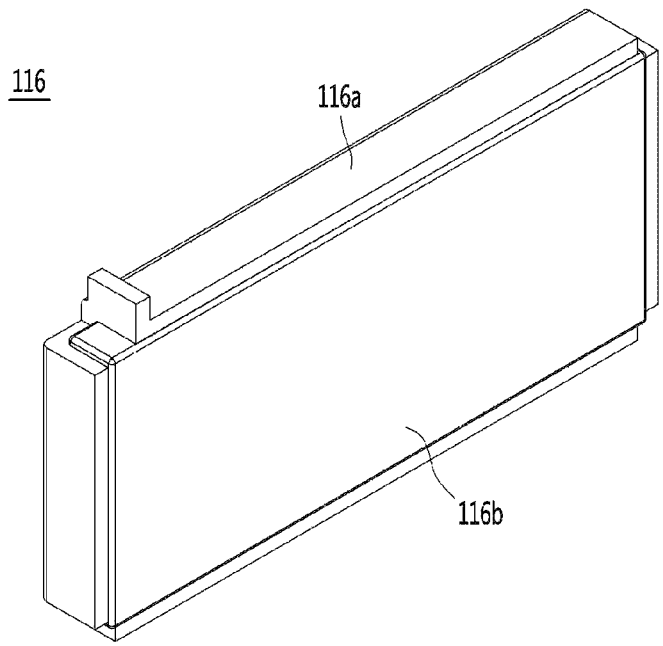

【Fig. 17b】
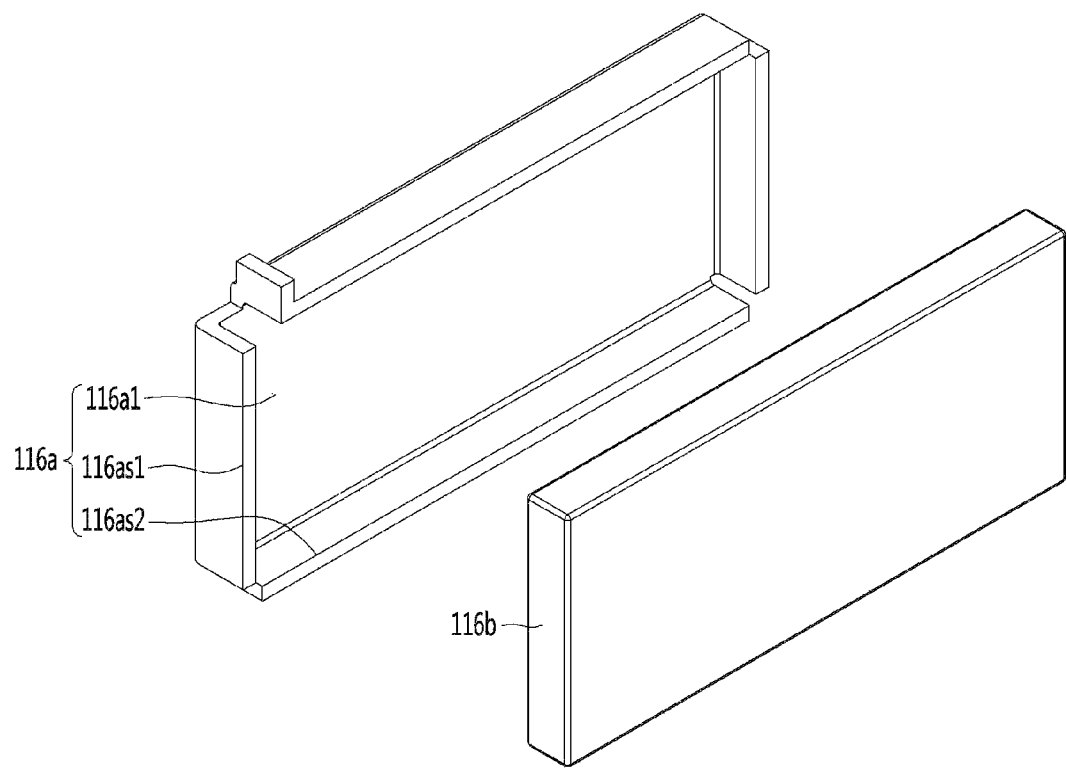

【Fig. 18a】
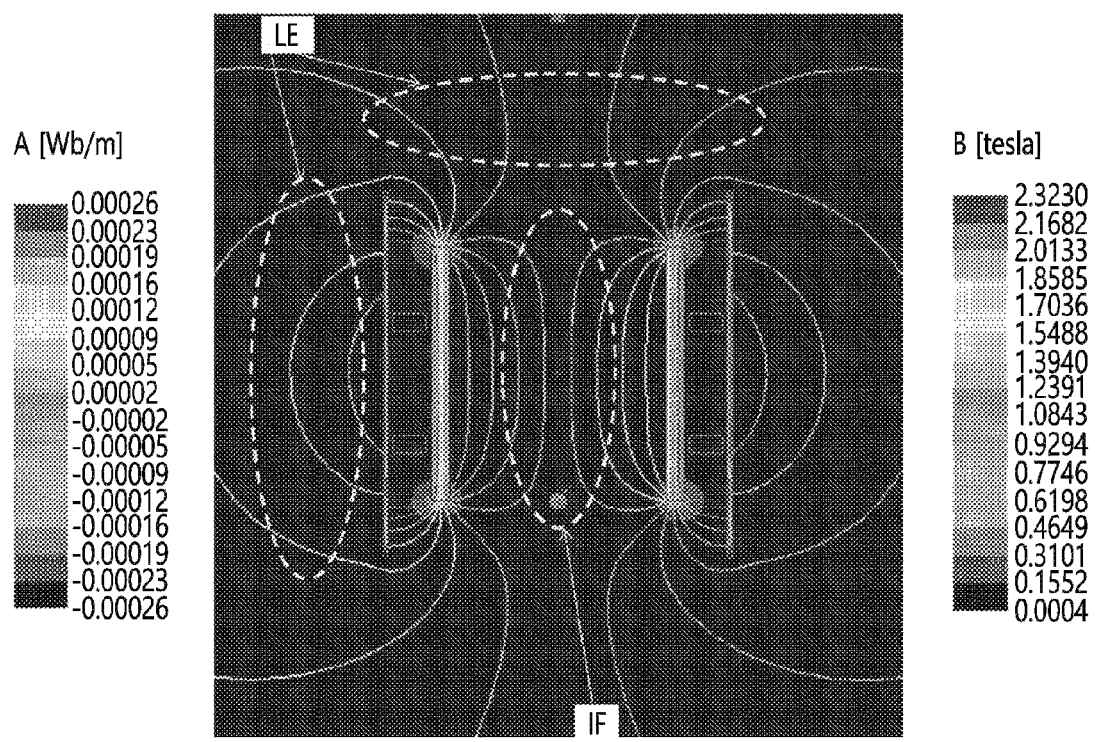

[Fig. 18b]
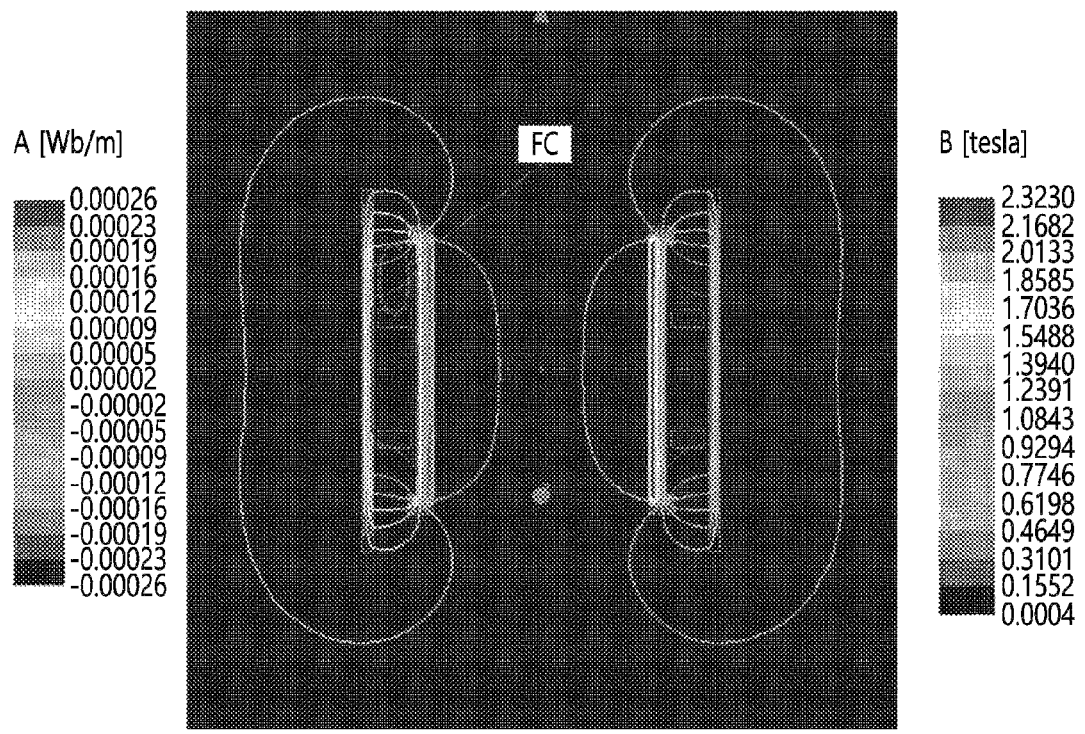

【FIG. 19】
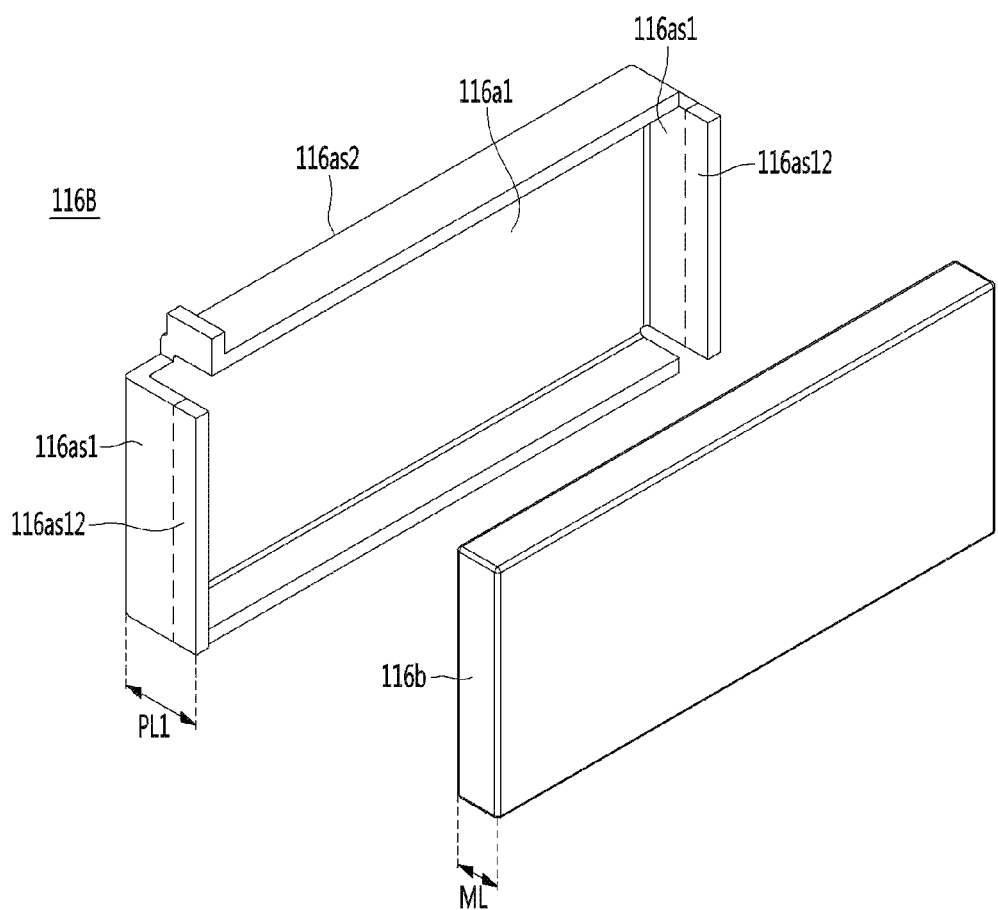

[FIG. 20]
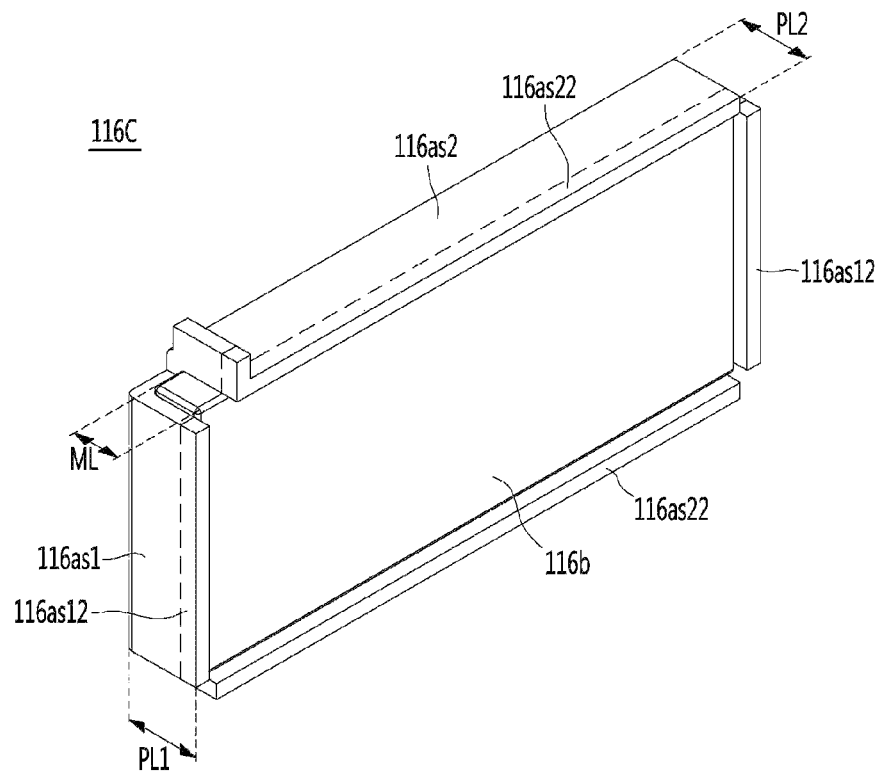
[FIG. 21]
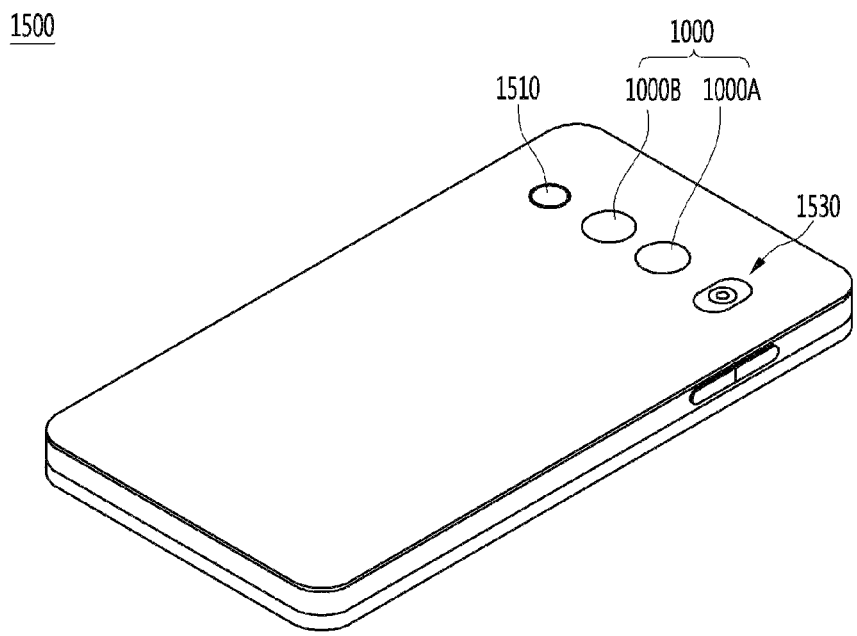

CAMERA ACTUATOR AND CAMERA MODULE INCLUDING THE SAME

CROSS REFERENCE TO RELATED APPLICATIONS

This application is the National Phase of PCT/KR2020/008865 filed on Jul. 7, 2020, which claims priority under 35 U.S.C. § 119 (a) to Patent Application No. 10-2019-0084504 filed in the Republic of Korea on Jul. 12, 2019, all of which are hereby expressly incorporated by reference into the present application.

TECHNICAL FIELD

The embodiment is a camera actuator and a camera module including the same. Specifically, it relates to an optical image stabilizer (OIS) actuator and a camera module including the same.

BACKGROUND ART

The camera module captures a subject and stores it as an image or video, and is installed in mobile terminals such as cell phones, laptops, drones, and vehicles.

On the other hand, portable devices such as smartphones, tablet PCs, and laptops have built-in miniature camera modules. Such camera modules may perform an autofocus (AF) function that automatically adjusts the distance between the image sensor and the lens to align the focal lengths of the lenses.

In addition, recent camera modules can increase or decrease the magnification of a distant subject through a zoom lens to perform a zooming function of zooming up or out.

In addition, recent camera modules employ image stabilization (IS) technology to correct or prevent image shake due to camera movement caused by unstable fixing devices or user movement.

These image stabilization (IS) technologies include Optical Image Stabilizer (OIS) technology and image stabilization prevention technology using an image sensor.

OIS technology is a technology that corrects motion by changing the path of light, and image stabilization technology using an image sensor is a technology that compensates movement in a mechanical and electronic way, but OIS technology is being adopted more.

On the other hand, in the image sensor, the resolution increases as the pixel becomes higher, and the size of the pixel becomes smaller. As the pixel becomes smaller, the amount of light received at the same time decreases. Therefore, the higher the resolution of a camera, the more severe the image shake due to hand shake that occurs when the shutter speed is slowed down in a dark environment.

Accordingly, the OIS function has recently been adopted as a necessity in order to take images without distortion using a high-pixel camera in a dark night or in a moving picture.

On the other hand, OIS technology is a method of correcting image quality by moving the lens or image sensor of the camera to correct the optical path. In particular, the OIS technology detects the movement of the camera through a gyro sensor and calculates the distance that the lens or image sensor should move based on this.

For example, the OIS correction method includes a lens movement method and a module tilting method. In the lens movement method, only the lens in the camera module is moved to realign the center of the image sensor and the optical axis. On the other hand, the module tilting method is a method of moving the entire module including the lens and image sensor.

In particular, the module tilting method has a wider correction range than the lens movement method and has the advantage of minimizing image distortion because the focal length between the lens and the image sensor is fixed.

On the other hand, in the case of the lens movement method, a Hall sensor is used to detect the position and movement of the lens. On the other hand, in the module tilting method, a photo reflector is used to detect the movement of the module. However, both methods use a gyro sensor to detect the movement of the camera user.

The OIS controller uses the data recognized by the gyro sensor to predict the position where the lens or module should move to compensate for the user's movement.

According to the recent technology trend, ultra-slim and ultra-small camera modules are required. In the ultra-small camera module, there is a space constraint for OIS operation, especially thickness, so it is difficult to implement the OIS function applied to general large cameras. There is a problem in that it is impossible to implement an ultra-slim and ultra-small camera module when OIS driving is applied.

In addition, in the conventional OIS technology, within the limited size of the camera module, as the OIS driver is disposed on the side of the solid lens assembly, there is a limitation in the size of the lens that is the object of the OIS, so there is a problem in that it is difficult to secure the amount of light.

In particular, in order to obtain the best optical properties from the camera module, alignment between lens groups must be well aligned when OIS is implemented through lens movement or module tilting. In the event of de-centralization or tilt, which is a phenomenon of inclination of the lens, the angle of view is changed or the focus is defocused, thereby adversely affecting image quality or resolution.

In addition, in the related art, active alignment between the lens of the camera module and the image sensor is performed. Active alignment ensures that the lens is precisely focused on the image sensor.

For example, active alignment between an image sensor assembly, a zoom assembly, and an OIS assembly is in progress in a camera module. As active alignment proceeds, not only the process is complicated, but also many issues are occurring in terms of precision and reliability.

In addition, in the conventional OIS technology, it is possible to implement AF or Zoom together with OIS driving. However, the OIS magnet and the AF or Zoom magnet are arranged close to each other due to the spatial restrictions of the camera module and the position of the driving part of the existing OIS technology. Accordingly, there is a problem in that the OIS operation is not properly performed due to magnetic field interference, which causes a decent or tilt phenomenon.

In addition, the conventional OIS technology has a problem in that the structure is complicated and power consumption increases because a mechanical driving device is required for lens movement or module tilting.

DISCLOSURE

Technical Problem

One of the technical problems of the embodiment is to provide an ultra-slim, ultra-small camera actuator and a camera module including the same.

One of the technical problems of the embodiment is a camera actuator and a camera module including the same, which can reduce the number of active alignment progress between a lens and an image sensor, and improve optical precision or reliability.

In addition, one of the technical problems of the embodiment is to provide a camera actuator and a camera module including the same, which can eliminate the size limitation of the lens in the lens assembly of the optical system when implementing OIS to ensure sufficient light quantity.

In addition, one of the technical problems of the embodiment is to provide a camera actuator and a camera module including the same, which can produce the best optical characteristics by minimizing the occurrence of a decent or tilt phenomenon when implementing OIS.

In addition, one of the technical problems of the embodiment is to provide a camera actuator and a camera module including the same, which can prevent magnetic field interference with a magnet for AF or Zoom when implementing OIS.

Also, one of the technical problems of the embodiment is to provide a camera actuator and a camera module including the same, which can implement OIS with low power consumption.

The technical problems of the embodiment are not limited to those described in this item, and include those that can be inferred from the entire description of the invention.

Technical Solution

The camera actuator according to the embodiment may include an integrated base 320, a first camera actuator 100 disposed in a first area of the integrated base 320, and a second camera actuator 200 disposed in a second area of the integrated base 320.

The integrated base 320 may include a first base body 321, a second base body 322, and a third base 323 disposed between the first base body 321 and the second base body 322.

A first camera actuator 100 may be disposed on the first base body 32, and a second camera actuator 200 may be disposed on the second base body 322.

The first base body 321 includes a first base body 321 and a first base side 321s extending upwardly from a side edge of the first base body 321. And the first base side 321s may support a side surface of the first camera actuator 100.

The second camera actuator 200 may include an image shake control unit 220; a complex module 130 in which the image shake control unit 220 is disposed; a first circuit board 228 for applying power to the image shake control unit 220; and a prism 232 for reflecting the light to the image shake control unit 220.

The complex module 130 may include a multi-frame 132 and a third lens 134 disposed on the multi-frame 132.

The multi-frame 132 may include a barrel frame 132b on one side and a shaper frame 132s on the other side.

The complex module 130 may be disposed on the first base body 321 and the third base body 323.

At least a portion of the complex module 130 may be disposed on the second base body 323.

The embodiment may include a third lens 134 disposed on the barrel frame 132b; and an image shake control unit 220 disposed on the shaper frame 132s.

The image shake control unit 220 may include a shaper unit 222 disposed on the shaper frame 132s of the multi-frame 132, and a first driving unit 72M, a second driving unit 72C for driving the shaper unit 222.

The shaper frame 132s may include a first frame body 132s1; a second frame sidewall 132s2 extending upwardly from the bottom edge of the first frame body 132s1; and a single or a plurality of third frame protrusions 132s3 protruding from an inner bottom of the first frame body 132s1.

The shaper frame 132s may include a single or a plurality of frame recesses 132sr on one side of the second frame sidewall 132s2.

The shaper unit 222 may include a shaper body 222a including an opening through which light can pass; a protrusion 222b extending laterally from the shaper body 222a and coupled to the first driving part 72M in a first vertical direction; and a lens unit 222c disposed on the shaper body 222a in a second vertical direction opposite to the first vertical direction and including a variable prism 222cp.

An additional embodiment may include a prism housing disposed on the second base body 322, a second prism unit disposed on the prism housing, and a prism driving unit for driving the second prism unit.

The prism driving unit may tilt the second prism unit to a first axis or a second axis.

The second prism unit may include a second prism disposed on a second prism mover.

The prism driving unit may include a first magnet and a second magnet respectively disposed on one side and the other side of the prism mover, a single or a plurality of balls disposed in an outer recess of the prism mover, a first coil unit and a first Hall sensor disposed on one side of the prism housing at a corresponding position to the first magnet, a second coil unit and a second Hall sensor disposed on the other side of the prism housing at a position corresponding to the second magnet; and an OIS circuit board for applying power to the first coil unit and the second coil unit.

In addition, the camera actuator according to the embodiment may include an integrated base 320; a first camera actuator 100 disposed in a first area of the integrated base 320; a second camera actuator 200 disposed in a second area of the integrated base 320. And the second camera actuator 200 may include an image shake control unit 220; a complex module 130 in which the image shake control unit 220 is disposed; a first circuit board 228 for applying power to the image shake control unit 220; and a prism 232 for reflecting the light to the image shake control unit 220.

The complex module 130 may include a multi-frame 132 and a third lens 134 disposed on the multi-frame 132.

The multi-frame 132 includes a barrel frame 132b on one side and a shaper frame 132s on the other side, and the third lens 134 is disposed on the barrel frame 132b, The image shake control unit 220 may be disposed in the shaper frame 132s.

The integrated base 320 may include a first base body 321, a second base body 322, and a third base body 323 disposed between the first base body 321 and the second base body, and a first camera actuator 100 may be disposed on the first base body 32, and a second camera actuator 200 may be disposed on the second base body 322.

The camera module according to the embodiment may include any one of the above camera actuators.

Advantageous Effects

According to the embodiment, there is a technical effect that can provide an ultra-slim, ultra-small camera actuator and a camera module including the same.

For example, according to the embodiment, the third lens 134 is disposed on the barrel frame 132b of the multi-frame 132, and the shaper unit 222 is disposed on the shaper frame 132s, so that there is a technical effect that can provide a ultra-slim, ultra-small camera actuator and a camera module including the same.

According to the embodiment, a camera actuator and a camera module including the same capable of reducing the number of active alignment processes between a lens and an image sensor and improving optical precision or reliability can be provided.

For example, the camera module 1000A of the embodiment may be precisely mounted so that the first camera actuator 100 and the second camera actuator 200 are closely attached to the integrated base 320. Accordingly, the number of active alignments between the lens and the image sensor can be reduced. In addition, there is a technical effect that can improve the optical precision or reliability.

Also, according to the embodiment, the third lens 134 is disposed on the barrel frame 132b of the multi-frame 132 and the image shake control unit 220 including the shaper unit 222 may be disposed in the shaper frame 132s. Accordingly, the number of active alignments between the third lens 134, the image shake control unit 220 that is the OIS control unit and the image sensor can be reduced, and there is a technical effect in that optical precision or reliability can be improved.

In addition, according to the embodiment, there is a technical effect of providing a camera actuator and a camera module including the same capable of securing a sufficient amount of light by solving the size limitation of the lens in the lens assembly of the optical system when implementing OIS.

For example, according to the embodiment, the image shake control unit 220 may be disposed below the prism 232. Accordingly, when OIS is implemented, it is possible to solve the size limitation of the lens in the lens assembly of the optical system, and there is a technical effect of providing a camera actuator capable of securing sufficient light amount and a camera module including the same.

In addition, according to the embodiment, there is a technical effect that can provide a camera actuator and a camera module including the same capable of exhibiting the best optical characteristics by minimizing the occurrence of a decent or tilt phenomenon during OIS implementation.

For example, the embodiment includes an image shake control unit 220 that is stably disposed on the multi-frame 132. In addition, in the embodiment, OIS may be implemented using the shaper unit 222 and the first driving unit 72M for the lens unit 222c having the variable prism 222cp, and a decent or tilt phenomenon can be minimized. Accordingly, there is a technical effect that can provide a camera actuator capable of exhibiting the best optical characteristics and a camera module including the same.

In addition, according to the embodiment, when implementing OIS, there is a technical effect that can provide a camera actuator capable of preventing magnetic field interference with a magnet for AF or Zoom and a camera module including the same.

For example, according to the embodiment, when implementing OIS, the first driving unit 72M, which is a magnet driving unit, is disposed in the second camera actuator 200 separated from the first camera actuator 100. Accordingly, there is a technical effect of providing a camera actuator capable of preventing magnetic field interference with the AF or zoom magnet of the first camera actuator 100 and a camera module including the same.

In addition, according to the embodiment, there is a technical effect of providing a camera actuator capable of implementing OIS with low power consumption and a camera module including the same.

For example, according to the embodiment, unlike moving a plurality of existing solid lenses, by driving the shaper unit 222 using the first driving unit 72M as the magnet driving unit and the second driving unit 72C as the coil driving unit, OIS may be implemented for the lens unit 222c including the variable prism. Accordingly, there is a technical effect of providing a camera actuator capable of implementing OIS with low power consumption and a camera module including the same.

In addition, according to the embodiment, since the prism unit 230 and the lens unit 222c including the variable prism can be arranged very closely, even if the optical path change is minutely changed in the lens unit 222c, there is a special technical effect that the optical path in the actual image sensor unit can secure a wide range of changes.

For example, according to the embodiment, the lens unit 222c including the fixed prism 232 and the variable prism may be disposed very closely. Accordingly, a relatively large distance between the lens unit 222c and the image plane 190P of the first lens assembly (not shown) can be secured. Accordingly, it is possible to secure a wide first distance D1δ reflected on the image plane 190P according to the change in the inclination of the predetermined angle Θ in the variable prism 222cp. Therefore, even if the optical path change is made minutely in the lens unit 222c, there is a special technical effect that can widen the optical path change in the actual image sensor unit.

The technical effects of the embodiments are not limited to those described in this item, and include those that can be inferred from the entire description of the invention.

DESCRIPTION OF DRAWINGS

FIG. 1a is a perspective view showing a camera module according to an embodiment.

FIG. 1b is an exploded perspective view of the camera module of the embodiment shown in FIG. 1a.

FIG. 2a is a perspective view in which the case is omitted from the camera module of the embodiment shown in FIG. 1b.

FIG. 2b is a perspective view in which the integrated base is separated from the camera module of the embodiment shown in FIG. 2a.

FIG. 3 is a detailed view of the integrated base in the camera module of the embodiment shown in FIG. 2b.

FIG. 4a is a partially exploded perspective view of a second camera actuator in the camera module of the embodiment shown in FIG. 2b;

FIG. 4b is an exploded perspective view of the rest of the element in the state in which the prism is omitted from the second camera actuator in the camera module of the embodiment shown in FIG. 4a.

FIG. 5 is a detailed view of a composite frame in the camera module of the embodiment shown in FIG. 4b.

FIG. 6a is a perspective view of the element of the second camera actuator excluding the prism and the first circuit board in the camera module of the embodiment shown in FIG. 4a.

FIG. 6b is a cross-sectional view taken along line A2-A2' in the camera module of the embodiment shown in FIG. 6a.

FIG. 7 is an exploded perspective view of the image shake control unit of the second camera actuator of the embodiment shown in FIG. 6a.

FIG. 8 is a perspective view of the shaper unit of the second camera actuator of the embodiment shown in FIG. 7;

FIG. 9 is a cross-sectional view of the lens unit taken along line A1-A1' of the shaper unit shown in FIG. 8;

FIGS. 10a to 10b are diagrams illustrating the operation of the second camera actuator according to the embodiment.

FIG. 11 is a diagram illustrating a first operation of a second camera actuator in the embodiment.

FIG. 12 is a view showing a second operation of the second camera actuator according to the embodiment;

FIG. 13 is a detailed perspective view of the first camera actuator of the embodiment shown in FIG. 1;

FIG. 14 is a perspective view in which the gyro sensor and the second circuit board are omitted in the first camera actuator of the embodiment shown in FIG. 13;

FIG. 15 is an example of interaction between the first magnet and the first coil unit in the first camera actuator in the embodiment shown in FIG. 14;

FIG. 16 is an exploded perspective view of the first lens assembly in the first camera actuator in the embodiment shown in FIG. 15;

FIG. 17a is a perspective view of a first magnet driving unit of the first lens assembly shown in FIG. 16;

FIG. 17b is an exploded perspective view of a first magnet driving unit of the first lens assembly shown in FIG. 17a;

FIG. 18a is magnetic flux density distribution data in a comparative example.

FIG. 18b is magnetic flux density distribution data in Example.

FIG. 19 is a perspective view (protruding further only from the second side) of the first magnet driving unit in the camera module according to the first additional embodiment.

FIG. 20 is a perspective view of a first magnet driving unit in a camera module according to a second additional embodiment.

FIG. 21 is a perspective view of a mobile terminal to which a camera module according to an embodiment is applied.

MODE FOR INVENTION

Hereinafter, an embodiment will be described in detail with reference to the accompanying drawings. Since the embodiment may have various changes and may have various forms, specific embodiments will be illustrated in the drawings and described in detail in the text. However, this is not intended to limit the embodiment to a specific disclosed form, and it should be understood to include all changes, equivalents, and substitutes included in the spirit and scope of the embodiment.

Terms such as "first" and "second" may be used to describe various elements, but the elements should not be limited by the terms. These terms are used for the purpose of distinguishing one component from another. In addition, terms specifically defined in consideration of the element and operation of the embodiment are only for describing the embodiment, and do not limit the scope of the embodiment.

In the description of the embodiment, in the case of being described as being formed in "up (on)" or "under (below)" of each element, up (on) or under (below) includes both elements in which two elements are in direct contact with each other or one or more other elements are disposed between the two elements indirectly. In addition, when expressed as "up (on)" or "under (below)", the meaning of not only the upward direction but also the downward direction based on one element may be included.

Also, as used hereinafter, relational terms such as "on/upper/above" and "under/lower/below" do not necessarily require or imply any physical or logical relationship or order between such entities or elements. In addition, it may be used to distinguish one entity or element from another entity or element.

Embodiment

FIG. 1a is a perspective view showing the camera module 1000A of the embodiment, and FIG. 1b is an exploded perspective view of the camera module 1000A of the embodiment shown in FIG. 1a.

In the drawings of the embodiment, the direction parallel to the optical axis may be referred to as the z-axis, and the plane perpendicular to the optical axis may be referred to as the xy plane. In the xy plane, the x-axis and the y-axis may be defined in mutually perpendicular directions, the x-axis may be defined as a horizontal coordinate axis, and the y-axis may be defined as a vertical coordinate axis, but it is not limited thereto.

Referring to FIGS. 1a and 1b, the camera module 1000A of the embodiment may include a single or a plurality of camera actuators. For example, the camera module 1000A of the embodiment may include a first camera actuator 100 and a second camera actuator 200.

The first camera actuator 100 may be referred to as a first camera device, a first camera assembly, or a first camera module. The second camera actuator 200 may also be referred to as a second camera device, a second camera assembly, or a second camera module.

The camera module 1000A of the embodiment may include a case 310. The case 310 may be referred to as a shield can.

For example, the case 310 may include a first case 311 and a second case 312 for protecting the first camera actuator 100 and the second camera actuator 200, respectively.

The material of the case 310 may be formed of any one or more of metal or plastic, glass-based epoxy, polycarbonate, or a composite material.

Referring to FIG. 1B, the first camera actuator 100 supports one or a plurality of lenses and moves the lenses up and down in response to a control signal from a predetermined control unit to auto-focus (AF) function or zoom function can be performed.

In addition, the second camera actuator 200 may be an OIS (Optical Image Stabilizer) actuator, but it is not limited thereto.

Hereinafter, the OIS actuator, which is the second camera actuator 200, will be mainly described, and thereafter, the first camera actuator 100 will be described with reference to FIG. 13 or the following drawings.

FIG. 2a is a perspective view in which the case 310 is omitted from the camera module 1000A of the embodiment shown in FIG. 1a, and FIG. 2b is an isolated perspective view of the integrated base 320 in the camera module 1000A of the embodiment shown in FIG. 2a.

One of the technical problems of the embodiment is intended to provide a camera module including a camera actuator that can reduce the number of active alignment progress between a lens and an image sensor, and improve optical precision or reliability In order to solve this technical problem, the camera module 1000A of the embodiment may assemble the first camera actuator 100 and the second camera actuator 200 on the integrated base 320. That is, in the embodiment, the first camera actuator 100 and the second camera actuator 200 may be precisely mounted to the integrated base 320 in close contact, and through this, there is a technical effect that can reduce the number of active alignments between the lens and the image sensor and improve optical precision or reliability.

Next, FIG. 3 is a detailed view of the integrated base 320 in the camera module of the embodiment shown in FIG. 2b.

Referring to FIG. 3, in the embodiment, the integrated base 320 may include a first base body 321, a second base body 322, and a third base body 323 disposed therebetween.

The material of the integrated base 320 may be formed of any one or more of plastic, glass-based epoxy, polycarbonate, metal, or a composite material.

A first camera actuator 100 may be disposed on the first base body 321.

A second camera actuator 200 may be disposed on the second base body 322.

The third base body 323 may function as a connection part between the first base body 321 and the second base body 322.

The first base body 321 may include a first base body 321 and a first base side 321s extending upwardly from a side edge of the first base body 321. The first base side 321s may function to support the side surface of the first camera actuator 100.

The first base body 321 may include one or a plurality of first base holes 321H. A predetermined Hall sensor (not shown) may be disposed in the first base hole 321H.

The second base body 322 is formed in an inclined shape so that the fixed prism 232 disposed thereafter can be closely coupled to the second base body 322 in the second camera actuator 200 such that there is a technical effect that prevents Prism Tilt and does not cause Decenter.

On the other hand, the following description is focused on the characteristics of the shaper unit 222 of the second camera actuator to implement OIS by controlling the optical path of the lens unit 222c including the variable prism 222cp.

On the other hand, in an additional embodiment, OIS can be implemented by tilting the second prism unit (not shown) including the second prism (not shown) to the first axis or the second axis instead of the fixed prism 232.

For example, the second prism unit may include a prism mover (not shown) and a second prism disposed on the receiving portion of the prism mover.

A first magnet and a second magnet may be disposed on one side and the other side of the prism mover, respectively.

In addition, a single or a plurality of balls may be disposed in the outer recess of the prism mover.

The second prism unit may be disposed in a predetermined housing. A first coil unit and a first Hall sensor may be provided in the housing at positions corresponding to the first magnets, and a second coil unit and a second Hall sensor may be provided at positions corresponding to the second magnets.

Power may be applied to the first coil unit and the second coil unit by an OIS circuit board.

In this additional embodiment, instead of the fixed prism 232, the electromagnetic force between the first magnet, the first coil unit and the second magnet, and the second coil unit acts as a driving unit to act as a driving unit to drive a second prism units (not shown) including a second prism (not shown) such that OIS can be implemented by tilting the second prism units with the optical axis (z-axis) as the first axis which is the horizontal axis, or the second axis which is the vertical axis.

In addition, the second base side 322s is formed to extend in the upward direction to correspond to both sides of the second base body 322 so that the fixed prism 232 can be closely coupled to the second base body 322.

In addition, the second base body 322 is provided with a single or a plurality of second base recesses 322R on the side of the second base side 322s, so that the second driving unit 72C which is a coil driving unit, can be stably installed thereafter.

Next, FIG. 4a is a partially exploded perspective view of the second camera actuator 200 in the camera module of the embodiment shown in FIG. 2a, and FIG. 4b is an exploded perspective view of the remaining elements after the prism 232 is omitted from the second camera actuator 200 of the camera module of the embodiment shown in FIG. 4a.

In the camera module of the embodiment, the second camera actuator 200 includes an image shake control unit 220, a complex module 130 in which the image shake control unit 220 is disposed, a first circuit board 228 for applying power to the image shake control unit 220, and a prism 232 for reflecting the light to the image shake control unit 220.

Referring to FIG. 4a, in the embodiment, the prism 232 may be a fixed prism or a right-angle prism.

Next, referring to FIGS. 4a and 4b, the first circuit board 228 may be connected to a predetermined power supply (not shown) to apply power to the image shake control unit 220. The first circuit board 228 is a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

Referring to FIG. 4b, the complex module 130 may include a multi-frame 132 and a third lens 134 disposed in the multi-frame 132.

Next, FIG. 5 is a detailed view of the multi-frame 132 in the camera module of the embodiment shown in FIG. 4b.

Referring to FIG. 3, in an embodiment, the complex module 130 may be disposed on the first base body 321 and the third base body 323.

For example, the third lens 134 of the complex module 130 may be disposed on the first base body 321, and the multi-frame 132 of the first base body 321 may be disposed on the third base body 323.

In addition, at least a portion of the complex module 130 may be disposed on the second base body 323. For example, a portion of the multi-frame 132 of the complex module 130 may be disposed on the second base body 322.

In the embodiment, the multi-frame 132 may include a barrel frame 132b on one side and a shaper frame 132s on the other side.

Through this, the third lens 134 can be disposed on the barrel frame 132b of the multi-frame 132 of the embodiment, and the shaper unit 222 described later may be disposed on the shaper frame 132s, which is the other side.

According to the embodiment, the third lens 134 is disposed on the barrel frame 132b of the multi-frame 132, and the shaper unit 222 is disposed on the shaper frame 132s, whereby the lens and the image sensor are disposed. It is possible to provide a camera actuator capable of reducing the number of active alignment (AA) progress between image sensors and improving optical precision or reliability, and a camera module including the same.

More specifically, according to the applicant's undisclosed internal technology, the primary AA (Active Align) between the zoom actuator and the image sensor assembly and the secondary AA (Active Align) between the OIS actuator and the zoom actuator are required, so at least two times AA (Active Align) was required.

On the other hand, according to the embodiment, the first camera actuator 100, which is a zoom actuator, and the second camera actuator 200, which is an OIS actuator, are mechanically coupled to the integrated body 320 such that it is necessary to proceed with only one time AA (Active Align). Accordingly, when assembling the camera module, the number of active alignment steps can be reduced to only one, and there is a technical effect that can significantly improve optical precision or reliability.

In addition, according to the embodiment, the third lens 134 is disposed on the barrel frame 132b of the multi-frame 132, and the shaper unit 222 is disposed on the shaper frame 132s such that there is a technical effect that can provide an ultra-slim, ultra-small camera actuator and a camera module including the same.

Further, according to the embodiment, the third lens 134 is disposed on the barrel frame 132b of the multi-frame 132, and the shaper unit 222 is disposed on the shaper frame 132s such that the number of active alignments between the third lens 134, the shaper unit 222 which is the OIS control unit and the image sensor can be reduced, and there is a technical effect that can improve optical precision or reliability.

The shaper frame 132s may include a first frame body 132s1, a second frame sidewall 132s2 extending in a vertical upward direction from a bottom edge of the first frame body 132s1, and a single or a plurality of third frame protrusions 132s3 protruding from an inside of the bottom of the first frame body 132s1.

According to the embodiment, the shaper unit 222 can be firmly arranged and fixed by the second frame sidewall 132s2 and the third frame protrusion 132s3, so that optical precision and mechanical reliability can be improved.

The shaper frame 132s has a single or a plurality of frame recesses 132sr on one side of the second frame sidewall 132s2, so that the second driving unit 72C which is a coil driving unit can be stably disposed.

Next, FIG. 6a is a perspective view of the remaining element in which the prism and the first circuit board are omitted from the second camera actuator 200 in the camera module of the embodiment shown in FIG. 4a, and FIG. 6b is a cross-sectional view along the line A2-A2' in the camera module of the embodiment shown in FIG. 6a.

Referring to FIGS. 6a and 6b, the image shake control unit 220 may be firmly disposed on the shaper frame 132s of the multi-frame 132 of the embodiment, and the third lens on the barrel frame 132b 134 may be disposed.

The image shake control unit 220 may include a shaper unit 222 disposed on the shaper frame 132s of the multi-frame 132, and a first driving unit 72M for driving the shaper unit 222, and a second driving unit 72C.

The first driving unit 72M may be a magnet driving unit, and the second driving unit 72C may be a coil driving unit. The second driving unit 72C may be disposed at an outer position facing and adjacent to the first driving unit 72M.

Next, FIG. 7 is an exploded perspective view of the image shake control unit 220 of the second camera actuator of the embodiment shown in FIG. 6a.

Referring to FIG. 7, the first driving unit 72M may include a single or a plurality of magnet frames 72MC disposed on the side surface of the shaper unit 222, and a driving unit 72MM disposed on the magnet frame 72MC. The unit driving unit 72MM may be first to fourth unit driving units 72M1, 72M2, 72M3, and 72M4, each of which may include first to fourth magnets.

In the embodiment, the first driving unit 72M may further include a magnet yoke 72MY disposed on the magnet frame 72MC to block the interference of the magnetic field.

Next, FIG. 8 is a perspective view of the shaper unit 222 of the second camera actuator of the embodiment shown in FIG. 7, and FIG. 9 is a cross-sectional view of the lens unit along a line A1-A1' of the shaper unit 222 shown in FIG. 8.

First, referring to FIG. 8, the shaper unit 222 may include a shaper body 222a having an opening through which light can pass, a protrusion 222b extending laterally from the shaper body 222a and coupled in a first vertical direction to the first driving unit 72M, and a lens unit having a variable prism 222cp while disposed on the shaper body 222a in a second vertical direction opposite to the first vertical direction 222c.

Specifically, in the embodiment, the shaper unit 222 may include a plurality of magnet support portions respectively extending to both sides from the shaper body 222a. For example, the shaper unit 222 may include a first protrusion 222b1 and a second protrusion 222b2 that branch and extend toward a first side from the shaper body 222a, and include a third protrusion 222b3 and a fourth protrusion 222b4 branching and extending toward the second side.

The first driving unit 72M may include first to fourth unit driving units 72M1, 72M2, 72M3, and 72M4 respectively coupled to the first to fourth projections 222b1, 222b2, 222b3, and 222b4.

Referring to FIG. 8, in the embodiment, the shaper unit 222 may include a coupling groove 222bh in the magnet support part to be coupled to the magnet frame. Through this, the image shake control unit 220 as shown in FIG. 7 may be coupled.

According to the embodiment, in the state in which the first driving unit 72M is firmly coupled to the shaper unit 222, the OIS can be implemented through the optical path control of the lens unit 222c having a variable prism such that there is a technical effect of minimizing the occurrence of a tilt phenomenon to produce the best optical properties.

Next, FIG. 9 is a cross-sectional view of the lens unit 222c along the line A1-A1' of the shaper unit 222 shown in FIG. 8.

Referring to FIG. 9, in the embodiment, the lens unit 222c may include a light-transmitting support 222c2, a bracket 222cb having a predetermined accommodating space and disposed on the light-transmitting support 222c2; a variable prism 222cp or a liquid lens (not shown) disposed in the receiving space of the bracket 222cb, and a flexible plate 222cm disposed on the variable prism 222cp or liquid lens, and a second light-transmitting support (not shown) disposed on the flexible plate 222cm.

The light-transmitting support 222c2 and the second light-transmitting support (not shown) may be formed of a light-transmitting material. For example, the light-transmitting support portion 222c2 and the second light-transmitting support portion may be formed of glass, but it is not limited thereto.

The light-transmitting support part 222c2 and the second light-transmitting support part may have a hollow circular ring shape or a prismatic ring shape.

The size of the second light-transmitting support (not shown) may be formed smaller than the size of the receiving space of the bracket 222cb.

The variable prism 222cp may include an optical liquid disposed in a space formed by the light-transmitting support 222c2, the support bracket 222cb, and the flexible plate 222 cm. Alternatively, the variable prism 222cp may include a wedge prism.

As the optical liquid employed by the variable prism 222cp in the embodiment, a transparent, low fluorescence, and non-toxic material may be employed. For example, the optical liquid of the embodiment may employ a chlorofluorocarbon (CFC) component, but it is not limited thereto.

The bracket 222cb may be formed of a stretchable material or a non-stretchable material. For example, the bracket 222cb may be made of an elastic film material or a metal material, but it is not limited thereto.

When the flexible plate 222 cm receives a predetermined force by the shaper body 222a according to the movement of the first driving part 72M, as shown in FIG. 10b, a portion of the flexible plate 222 cm having a characteristic of a flexible elastic material may move upward or downward, and the shape of the variable prism 222cp may become variable.

For example, the flexible plate 222 cm may be a reverse osmosis (RO) membrane, a nano filtration (NF) membrane, an ultra-filtration (UF) membrane, or a micro filtration (MF) membrane, but it is not limited thereto. Here, the RO membrane is a membrane having a pore size of about 1 to 15 Å, the NF membrane is a membrane having a pore size of about 10 Å, the UF membrane is a membrane having a pore size of about 15 to 200 Å, and the MF membrane may be a membrane having a pore size of about 200 to 1000 Å.

According to the embodiment, the image shake control unit 220 can be stably disposed on the multi-frame 132, and the variable prism 222cp including the shaper unit 222 and the first driving unit 72M. When the OIS is implemented through the lens unit 222c provided, there is a technical effect of minimizing the occurrence of a decent or a tilt phenomenon to provide the best optical characteristics.

Next, FIGS. 10a to 10b are diagrams illustrating the operation of the second camera actuator 200 according to the embodiment.

For example, FIG. 10a is an exemplary diagram before operation of the OIS actuator of the embodiment, and FIG. 10b is an exemplary diagram after operation of the OIS actuator of the embodiment.

In a broad sense, in the embodiment, the prism can be disposed under the fixed prism 232 and the fixed prism 232 to change the path of a predetermined light beam, and may include a variable prism 222cp to change the path of the light beam emitted from the fixed prism 232.

Referring to FIGS. 10a and 10b, the second camera actuator 200 of the embodiment changes the shape of the variable prism 222cp through the first driving unit 72M and the second driving unit 72C to change the light movement path.

For example, in the embodiment, the second camera actuator 200 controls the path of the light beam by changing the vertex angle Θ of the variable prism 222cp through the first driving unit 72M which is a magnet driving unit.

For example, referring to FIG. 10a, the incident light beam L1 can be changed to the second movement path L1a by the fixed prism 232, but the light path is not changed in the variable prism 222cp.

On the other hand, referring to FIG. 10b, the second movement path L1a of the light beam changed by the fixed prism 232 may be changed in the variable prism 222cp to be changed to the third movement path L1b.

For example, when the flexible plate 222 cm receives a predetermined force by the shaper body 222a according to the movement of the first driving part 72M, the second light-transmitting support part (not shown) receives the force, and the force is transmitted to the flexible plate 222. And a portion of the flexible elastic material of the flexible plate 222 cm moves upward or downward, and the shape of the variable prism 222cp can be variable.

For example, the upper left side of the shaper body 222a may receive the force F2 in the second direction by the first unit driving unit 72M1, also, the upper right end of the shaper body 222a may receive the force F1 in the first direction by the second unit driving unit 72M2 such that the shaper body 222a can be changed, and the second light-transmitting support (not shown) receives a force according to the movement of the shaper body 222a. By this force, the flexible plate 222 cm may be varied with a slope of a predetermined angle Θ.

Hereinafter, with reference to FIG. 10b, the image stabilization device for controlling the path of the light beam by changing the shape of the variable prism 222cp through the first driving unit 72M in the embodiment will be described in more detail.

First, according to the embodiment, according to the occurrence of hand shake, on the image plane 190 of the first lens assembly (not shown) provided in the first camera actuator 100, the image needs to be moved to the side by the first distance D1δ.

At this time, D1 is the distance from the variable prism 222cp to the image plane 190 of the first lens assembly, δ is the chromatic aberration of the variable prism 222cp, and Θ is the vertex angle of the variable prism 222cp.

That is, according to the embodiment, after calculating the vertex angle Θ of the variable prism 222cp to be changed, the vertex angle Θ of the variable prism 222cp is changed through the first driving unit 72M to change the vertex angle Θ of the light beam such that the path may be controlled as the third path L1b.

At this time, between the chromatic aberration δ of the variable prism 222cp and the vertex angle Θ of the variable prism 222cp, a relationship of δ=(n−1)×Θ may be established (provided that n is a refractive index of the variable prism 222cp with respect to a central wavelength of the band of interest).

According to the embodiment, since the prism unit 230 and the lens unit 222c including the variable prism can be arranged very closely, even if the optical path change is minutely changed in the lens unit 222c, there is a special technical effect that the actual image sensor unit can secure a wide range of the optical path.

For example, according to the embodiment, the lens unit 222c including the fixed prism 232 and the variable prism can be disposed very closely, but the distance between the lens unit 222c and the image plane 190 the first lens assembly (not shown) can be disposed relatively remote. Accordingly, it is possible to secure a wide first distance D1δ reflected on the image plane 190 according to a change in the inclination of the predetermined angle Θ in the variable prism 222cp. Therefore, even if the optical path change is made minutely in the lens unit 222c, there is a special technical effect that can widen the optical path change in the actual image sensor unit.

Next, FIGS. 11 to 12 are diagrams illustrating the operation of the second camera actuator 200 according to the embodiment.

For example, FIG. 11 is a view illustrating a first operation of the second camera actuator 200 in the z-axis direction according to the embodiment shown in FIG. 1B.

Referring to FIG. 11, power may be applied to the second driving unit 72C through the circuit board 228, and current may flow through each coil. Accordingly, electromagnetic force may be generated between the second driver 72C and the first driver 72M in the first direction F1 or the second direction F2. In addition, the flexible plate 222 cm can be tilted at a predetermined angle by the moving first driving unit 72M, and accordingly, the vertex angle Θ of the variable prism 222cp may be controlled.

In this case, the second driving unit 72C of the embodiment may be a coil driving unit, and a fifth unit driving unit 72C1, a sixth unit driving unit 72C2, a seventh unit driving unit 72C3, and an eighth unit driving unit 72C4 may be provided, respectively at a position facing the first to fourth unit driving units 72M1, 72M2, 72M3, 72M4 of the first driving unit 72M which is a magnet driving unit.

Referring back to FIG. 11, in the embodiment, the first unit driving unit 72M1 and the second unit driving unit 72M2 may be arranged to generate a magnetic force in the direction of the fifth unit driving unit 72C1 and the sixth unit driving unit 72C2. Also, the third unit driving unit 72M3 and the fourth unit driving unit 72M4 may be arranged to generate a magnetic force in the direction of the seventh unit driving unit 72C3 and the eighth unit driving unit 72C4.

At this time, when the current C1 in the first direction flows in the fifth unit driver 72C1 and the sixth unit driver 72C2, the force F2 may be applied in the second direction. Meanwhile, when the current C1 in the first direction flows in the seventh unit driver 72C3 and the eighth unit driver 72C4, the force F1 may be applied in a first direction opposite to the second direction.

Accordingly, with respect to the flexible plate 222 cm, the force F2 may be applied in the second direction in the first unit driving unit 72M1 and the second unit driving unit 72M2. In addition, the force F1 may be applied in the first direction in the third unit driving unit 72M3 and the fourth unit driving unit 72M4. Accordingly, by changing the vertex angle Θ of the variable prism 222cp to the first angle Θ, it is possible to change and control the path of the light.

Next, FIG. 12 is a second operation example diagram of the second camera actuator 200 of the embodiment.

For example, FIG. 12 is a view illustrating a second operation of the second camera actuator 200 in the z-axis direction according to the embodiment shown in FIG. 1B.

For example, power is applied to the second driving unit 72C and a current flows through each coil, and accordingly, electromagnetic force is generated between the second driving unit 72C and the first driving unit 72M in the first direction F1 or in the second direction F2, the flexible plate 222 cm may be tilted at a predetermined angle.

For example, referring to FIG. 12, the first unit driving unit 72M1 and the second unit driving unit 72M2 may be arranged to generate a magnetic force in the direction of the fifth unit driving unit 72C1 and the sixth unit driving unit 72C2. Also, the third unit driving unit 72M3 and the fourth unit driving unit 72M4 may be arranged to generate a magnetic force in the direction of the seventh unit driving unit 72C3 and the eighth unit driving unit 72C4.

At this time, a current C1 in the first direction flows through the fifth unit driving unit 72C1 and the seventh unit driving unit 72C3, and a current C2 in the second direction may flow through the sixth unit driving unit 72C2 and the eighth unit driving unit 72C4.

Accordingly, the force F2 may be applied in the second direction to the first unit driving unit 72M1 and the fourth unit driving unit 72M4, and a force F1 may be applied in the first direction to the second unit driving unit 72M2 and the third unit driving unit 72M3.

Accordingly, with respect to the flexible plate 222 cm of the variable prism 222cp, the force F2 may be applied in the second direction in the first unit driving unit 72M1 and the fourth unit driving unit 72M4. And the force F1 may be applied in the first direction to second unit driving unit 72M2 and the third unit driving unit 72M3. So, the vertex angle Θ of the variable prism 222cp is transformed to a second angle Θ, the path of light can be changed and controlled.

Hereinafter, the technical characteristics of the first camera actuator 100 will be described with reference to FIG. 13 or the following drawings.

FIG. 13 is a detailed perspective view of the first camera actuator 100 of the embodiment shown in FIG. 1, and FIG. 14 is a perspective view in which the gyro sensor 154 and the second circuit board 152 are omitted in the first camera actuator 100 of the embodiment of FIG. 13.

Referring to FIGS. 13 and 14, the first camera actuator 100 according to the embodiment may include a first lens assembly 110 and a second lens assembly 120.

For example, the first camera actuator 100 of the embodiment may include a first lens assembly 110, a second lens assembly 120 disposed on a first base body 321 (see FIG. 3), and a first magnet driving unit 116 respectively disposed in the first lens assembly 110 and the second lens assembly 120, and a coil driving unit 141b disposed outside the first magnet driving unit 116, a first back yoke 156 disposed outside of the coil driving unit 141b, a second circuit board 152 disposed outside the first back yoke 156, and a gyro sensor 154 disposed outside the second circuit board 152.

The second circuit board 152 may be connected to a predetermined power supply unit (not shown) to apply power to the coil driving unit 141b. The second circuit board 152 may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

Next, FIG. 15 is a diagram illustrating the interaction between the first magnet driving unit 116 and the coil driving unit 141b in the first camera actuator 100 in the embodiment shown in FIG. 14, and FIG. 16 is an exploded perspective view of the first lens assembly 110 in the first camera actuator 100 in the embodiment shown in FIG. 15.

Referring to FIG. 16 first, in the embodiment, the first lens assembly 110 may include a first lens barrel 112a in which a first lens (not shown) is disposed, and a driving unit housing (112b) in which a first magnet 116 is disposed. The first lens barrel 112a and the first driving unit housing 112b may be a first housing, and the first housing may have a barrel or tube shape. The first magnet 116 may be a magnet driving unit, but it is not limited thereto, and a coil may be disposed in some cases.

In addition, the second lens assembly 120 may include a second lens barrel (not shown) in which a second lens (not shown) is disposed and a second driving unit housing (not shown) in which a second magnet (not shown) is disposed. The second lens barrel (not shown) and the second driving unit housing (not shown) may be a second housing, and the second housing may have a barrel or tube shape. The second magnet may be a magnet driving unit, but it is not limited thereto, and a coil may be disposed in some cases.

The embodiment may be driven using a single or a plurality of balls. For example, the embodiment may include a single or a plurality of first balls B1 disposed in the first barrel recess 112ar on the upper side of the first lens barrel 112a of the first lens assembly 110.

The embodiment may also include a single or a plurality of second balls B2 disposed in the first housing recess 112br under the first driving unit housing 112b of the first lens assembly 110.

The first housing recess 112br may have a rail shape. For example, the first housing recess 112br may have a rail shape having a V-shaped cross-section.

The cross-section of the first housing recess 112*br* may be in a U-shape or a shape in contact with the second ball 117 at two or three points in addition to the V-shape.

The second ball B2 may be disposed below the first housing recess 112*br* in a state of being seated in the first ball guide 113 having a hole having a predetermined single or a plurality of circular cross-sections. The first ball guide 113 may be referred to as a ball retainer.

As the second ball B2 rolls along the rail-shaped first housing recess 112*br*, the first lens assembly 110 may move.

In the embodiment, the first sensing magnet 112*a*M is disposed below the first lens barrel 112*a* of the first lens assembly 110 to sense and control the position.

Referring back to FIG. 15, the interaction in which electromagnetic force DEM is occurred between the first magnet 116 which is a magnet driving unit and the coil driving unit 141*b* in the camera module according to the embodiment will be described.

As shown in FIG. 15, the magnetization method of the magnet in the first magnet 116 in the camera module according to the embodiment may be a vertical magnetization method. For example, in the embodiment, both the N pole 116N and the S pole 116S of the magnet may be magnetized to face the coil driving unit 141*b*. Accordingly, the N pole 116N and the S pole 116S of the magnet may be respectively disposed to correspond to the region in which the current flows in the y-axis direction perpendicular to the ground in the coil driving unit 141*b*.

Referring to FIG. 15, in the embodiment, a magnetic force DM may be applied in the opposite direction to the x-axis at the N pole 116N of the first magnet 116 (in this case, the direction of the magnetic force may be a positive direction or a negative direction of the illustrated direction). When the current DE flows in the y-axis direction in the region of the coil driving unit 141*b* corresponding to the N pole 116N, the electromagnetic force DEM acts in a direction parallel to the z-axis according to Fleming's left-hand rule.

In addition, in the embodiment, the magnetic force DM may be applied in the x-axis direction at the S pole 116S of the first magnet 116. In addition, when the current DE flows in the opposite direction to the y-axis perpendicular to the ground in the coil driving unit 141*b* corresponding to the S pole 116S, the electromagnetic force DEM acts in a direction parallel to the z-axis according to Fleming's left-hand rule. (At this time, the direction of the electromagnetic force may be a positive direction or a negative direction of the illustrated direction).

At this time, since the coil driving unit 141*b* is in a fixed state, the first lens assembly 110 which is a mover in which the first magnet 116 is disposed, can be moved parallel to the z-axis direction by the electromagnetic force DEM according to the current direction along the rail of the first housing recess 112*br* in the z-axis direction. The electromagnetic force DEM may be controlled in proportion to the current DE applied to the coil driver 141*b*.

Similarly, in the camera module according to the embodiment, an electromagnetic force (DEM) is generated between the second magnet (not shown) and the second coil unit (not shown), so that the second lens assembly 120 may move along the rail of the second housing recess (not shown) horizontal to the optical axis.

Next, FIG. 17*a* is a perspective view of the first magnet driving unit 116 of the first lens assembly shown in FIG. 16, and FIG. 17*b* is an exploded perspective view of the first magnet driving unit 116 of the first lens assembly shown in FIG. 17*a*.

Referring to FIG. 17*a*, in the embodiment, the first magnet driving unit 116 may include a first magnet 116*b* and a first magnet yoke 116*a*.

Referring to FIG. 17*b*, the first magnet yoke 116*a* may include a first yoke body 116*a*1, a first side protrusion 116*as*1 extended to the first yoke body 116*a*1 from a corresponding edge of the first yoke body 116*a*1, and a second side protrusion 116*as*2 extending to the side of the first magnet 116*b* from an opposite corresponding edge of the first yoke body 116*a*1.

The first side protrusions 116*as*1 may be disposed on both sides of the first magnet 116*b*.

Also, the first magnet yoke 116*a* may include a third side protrusion (not shown) extending in a direction different from, for example, the opposite direction to, the first side protrusion 116*as*1. The third side protrusion may be disposed at an intermediate position of the first yoke body 116*a*1, but it is not limited thereto.

The first magnet yoke 116*a* may be formed of a ferromagnetic material, but it is not limited thereto.

Also in the related art, when implementing AF or Zoom, a plurality of lens assemblies are driven by electromagnetic force between magnets and coils, but there is a problem in that magnetic field interference occurs between magnets mounted on each lens assembly. Due to magnetic field interference between these magnets, AF or zoom operation is not properly performed, so there is a problem in that thrust is lowered.

Also, there is a problem of causing a decent or tilt phenomenon due to magnetic field interference between magnets.

If there is an issue with the precision of camera control or the thrust is lowered due to such magnetic field interference, or if a decent or tilt phenomenon is induced, it may directly affect the safety or life of the user, the driver or pedestrian.

For example, FIG. 18*a* is magnetic flux density distribution data in a comparative example.

The comparative example of FIG. 18*a* is a structure applied to a magnetic flux shielding function by arranging a back yoke for a magnet as the applicant's undisclosed internal technology. Although the magnetic flux shielding performance was improved by the application of the back yoke technology to the magnet, there were technical problems as follows.

For example, referring to FIG. 18*a*, magnetic flux density data between each magnet mounted in the first lens assembly and the second lens assembly, magnetic field interference (IF) between each magnet is generated. In addition, as the magnetic flux generated from each magnet is leaked (LE), there is a problem in that a loss of thrust is also generated.

In particular, in the case of the currently applied high magnification zoom actuator, not only magnetic field interference occurs between the permanent magnets of the first and second lens assemblies which are moving lenses, but also there is a problem in that magnetic field interference (IF) with the magnet of the OIS actuator occurs.

Due to such magnetic field interference (IF), there is a problem that the movement of each group is disturbed, and as a result, even the input current rises.

According to the embodiment, the yoke of the magnet driving unit of the first lens assembly 110 or the second lens assembly 120 includes a side protrusion extending to the side of the magnet. Accordingly, when implementing AF or Zoom, when a plurality of lens assemblies are driven by electromagnetic force between magnets and coils, there are special technical effects in that a camera actuator and a camera module including the same capable of preventing magnetic field interference between magnets mounted on each lens assembly can be provided.

For example, FIG. 18b is magnetic flux density distribution data in the embodiment.

FIG. 18b is magnetic flux density data between each magnet mounted on the first lens assembly 110 and the second lens assembly 120 according to the embodiment. According to this, the first magnet yoke 116a of the magnet driving unit of the first lens assembly 110 and the second lens assembly 120 includes a side protrusion extending to the side of the magnet, so that the magnetic field interference (IF) between the magnets is reduced and the precision of camera control is significantly improved.

In addition, according to the embodiment, the magnet yoke of the magnet driving unit of the first lens assembly 110 and the second lens assembly 120 includes a side protrusion extending to the side of the magnet. Accordingly, leakage of magnetic flux generated from the magnet can be prevented, and magnetic flux can be concentrated (FC) as the side protrusions are arranged in an area having a high magnetic flux density. Therefore, by increasing the density between the flux line and the coil, the Lorentz Force increases, which has the technical effect of significantly improving thrust.

Also according to the embodiment, the first magnet yoke 116a can include a first side protrusion 116as1 extending to the side of the first magnet 116b. In addition, as the first side protrusions 116as1 can be disposed on both sides of the first yoke body 116a1, the first magnet 116b can be firmly fixed, thereby remarkably improving mechanical reliability.

Accordingly, as the first magnet yoke 116a includes a first side protrusion 116as1 extending to the side of the first magnet 116b, magnetic field interference between magnets mounted on each lens assembly can be prevented. There is a complex technical effect in which mechanical reliability is improved as the first magnet 116b is firmly fixed, as well as an effect of improving the thrust according to magnetic flux concentration.

Next, FIG. 19 is a perspective view of the first magnet driving unit 116B in the camera module according to the first additional embodiment.

According to the first additional embodiment, the first magnet driving unit 116B may further include an extended first-second side protrusion 116as12 in the first side protrusion 116as1.

Accordingly, the combined thickness PL1 of the first side protrusion 116as1 and the first-second side protrusion 116as12 may be thicker than the thickness ML of the first magnet 116b.

The thickness PL1 of the first side protrusion 116as1 and the first second side protrusion 116as12, which are regions having high magnetic flux density, is greater than the thickness ML of the first magnet 116b. Therefore, the magnetic flux leakage shielding performance may be remarkably improved and the magnetic flux density dissipation efficiency may be increased. Also, while improving the magnetic flux shielding function, the magnetic flux concentration function can be strengthened.

According to the first additional embodiment, the magnet yoke of the first magnet driving unit 116C includes the first second side protrusions 116as12 extending upward than the upper surface of the magnet, thereby further increasing the leakage of magnetic flux. In addition to effectively preventing it, there is a special technical effect that thrust can be significantly improved by maximizing magnetic flux concentration in a region with high magnetic flux density.

Next, FIG. 20 is a perspective view of the first magnet driving unit 116C in the camera module according to the second additional embodiment.

In the second additional embodiment, the first magnet driving unit 116C may further include a second-second side protrusion 116as22 in which the second side protrusion 116as2 is extended.

Accordingly, the combined thickness PL2 of the second side protrusion 116as2 and the second-second side protrusion 116as22 may be thicker than the thickness ML of the first magnet 116b. Accordingly, the magnetic flux leakage shielding performance may be remarkably improved and the magnetic flux density dissipation efficiency may be increased. Therefore, while improving the magnetic flux shielding function, the magnetic flux concentration function can be strengthened.

According to the second additional embodiment, the magnet yoke of the magnet driving unit of the first lens assembly 110 and the second lens assembly 120 includes side protrusions having a structure surrounding the four sides of the magnet. Accordingly, there is a technical effect of more effectively preventing leakage of magnetic flux and of using the leakage-prevented magnetic flux density for improving thrust.

INDUSTRIAL APPLICABILITY

FIG. 21 is a mobile terminal 1500 to which a camera module according to an embodiment is applied.

As shown in FIG. 21, the mobile terminal 1500 of the embodiment may include a camera module 1000, a flash module 1530, and an autofocus device 1510 provided on the rear side.

The camera module 1000 may include an image capturing function and an auto focus function. For example, the camera module 1000 may include an auto-focus function using an image.

The camera module 1000 processes an image frame of a still image or a moving image obtained by an image sensor in a shooting mode or a video call mode. The processed image frame may be displayed on a predetermined display unit and stored in a memory. A camera (not shown) may also be disposed on the front of the mobile terminal body.

For example, the camera module 1000 may include a camera module 1000A and a second camera module 1000B, and the OIS implementation can be performed with the AF or zoom function by the camera module 1000A.

The flash module 1530 may include a light emitting device for emitting light therein. The flash module 1530 may be operated by a camera operation of a mobile terminal or a user's control.

The autofocus device 1510 may include one of the packages of the surface light emitting laser device as a light emitting part.

The auto-focus device 1510 may include an auto-focus function using a laser. The auto focus device 1510 may be mainly used in a condition in which the auto focus function using the image of the camera module 1000 is deteriorated, for example, close to 10 m or less or in a dark environment. The autofocus device 1510 may include a light emitting unit including a vertical cavity surface emitting laser (VCSEL) semiconductor device and a light receiving unit that converts light energy such as a photodiode into electrical energy.

The features, structures, effects, etc. described in the above embodiments are included in at least one embodiment, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the embodiments.

In the above, the embodiment has been mainly described, but this is only an example and not limiting the embodiment, and those of ordinary skill in the art to which the embodiment belongs are exemplified above in the range that does not deviate from the essential characteristics of the embodiment. It can be seen that various modifications and applications that have not been made are possible. For example, each component specifically shown in the embodiment can be implemented by modification. And differences related to such modifications and applications should be construed as being included in the scope of the embodiments set forth in the appended claims.

The invention claimed is:

1. A camera actuator comprising:
an integrated base;
a first camera actuator disposed in a first area of the integrated base; and
a second camera actuator disposed in a second area of the integrated base,
wherein the integrated base includes a first base body, a second base body, and a third base body disposed between the first base body and the second base body,
wherein the first camera actuator is disposed on the first base body,
wherein a part of the second camera actuator is disposed on the second base body,
wherein the second camera actuator comprises an image shake control unit and a complex module in which the image shake control unit is disposed,
wherein the complex module is disposed on the first base body and the third base body,
wherein the image shake control unit comprises a shaper unit, and
wherein the shaper unit includes a shaper body including an opening through which light passes, a protrusion extending laterally from the shaper body and coupled to a first driving part in a first vertical direction, and a lens unit disposed on the shaper body in a second vertical direction opposite to the first vertical direction and including a variable prism.

2. The camera actuator according to claim 1, wherein the first base body includes a first base side extending upwardly from a side edge thereof, and
wherein the first base side supports a side of the first camera actuator.

3. The camera actuator according to claim 1, wherein the second camera actuator further comprises:
a first circuit board for applying power to the image shake control unit; and
a prism reflecting light to the image shake control unit.

4. The camera actuator according to claim 3, wherein the complex module comprises a multi-frame and a third lens disposed in the multi-frame, and
wherein the multi-frame comprises a barrel frame on one side and a camera actuator including a shaper frame on an other side.

5. The camera actuator according to claim 4, further comprising:
a third lens disposed on the barrel frame; and
the image shake control unit disposed on the shaper frame,
wherein the shaper unit of the image shake control unit is disposed on the shaper frame of the multi-frame, a first driving unit and a second driving unit for driving the shaper unit.

6. The camera actuator according to claim 4, wherein the first base body includes a first base side extending upwardly from a side edge thereof, and
wherein the first base side supports a side of the first camera actuator.

7. The camera actuator according to claim 6, wherein at least a portion of the complex module is disposed on the second base body.

8. The camera actuator according to claim 1, further comprising
a prism housing disposed on the second base body;
a second prism unit disposed in the prism housing; and
a prism driving unit for driving the second prism unit,
wherein the prism driving unit controls tilting of the second prism unit to a first axis or a second axis,
wherein the second prism unit comprises a second prism disposed on a second prism mover, and
wherein the prism driving unit comprises:
first and second magnets respectively disposed on one side and an other side of the prism mover,
a single ball or a plurality of balls disposed in an outer recess of the prism mover,
a first coil unit and a first Hall sensor disposed on one side of the prism housing at a position corresponding to the first magnet;
a second coil unit and a second Hall sensor disposed on an other side of the prism housing at a position corresponding to the second magnet; and
an OIS circuit board for applying power to the first coil unit and the second coil unit.

9. A camera module comprising the camera actuator of claim 1.

10. A camera actuator comprising:
an integrated base;
a first camera actuator disposed in a first area of the integrated base; and
a second camera actuator disposed in a second region of the integrated base,
wherein the second camera actuator comprises:
an image shake control unit;
a complex module in which the image shake control unit is disposed;
a first circuit board for applying power to the image shake control unit; and
a prism that reflects a light to the image shake control unit,
wherein the complex module includes a multi-frame and a third lens disposed in the multi-frame,
wherein the multi-frame includes a barrel frame on one side and a shaper frame on an other side, and
wherein the shaper frame includes a first frame body, a second frame sidewall extending upwardly from a bottom edge of the first frame body, and a single or a plurality of third frame protrusions protruding from an inner bottom of the first frame body.

11. The camera actuator according to claim 10,
wherein the third lens is disposed in the barrel frame, and
wherein the image shake control unit is disposed in the shaper frame.

12. The camera actuator according to claim 11, wherein the integrated base includes a first base body, a second base body, and a third base body disposed between the first base body and the second base body, and wherein the first camera actuator is disposed on the first base body and the second camera actuator is disposed on the second base body.

13. The camera actuator according to claim 10, wherein the integrated base includes a first base body, a second base body, and a third base body disposed between the first base body and the second base body, and
wherein the first base body includes a first base side extending upwardly from a side edge thereof, wherein the first base side supports a side of the first camera actuator.

14. The camera actuator according to claim 13, wherein the complex module is disposed on the first base body and the third base body.

15. The camera actuator according to claim 14, wherein at least a portion of the complex module is disposed on the second base body.

16. The camera actuator according to claim 10, wherein the shaper frame further includes a single or a plurality of frame recesses on one side of the second frame sidewall.

17. A camera actuator comprising:
an integrated base;
a first camera actuator disposed in a first area of the integrated base; and
a second camera actuator disposed in a second area of the integrated base,
wherein the integrated base includes a first base body, a second base body, and a third base body disposed between the first base body and the second base body,
wherein the first camera actuator is disposed on the first base body,
wherein a part of the second camera actuator is disposed on the second base body,
wherein the second camera actuator comprises an image shake control unit and a complex module in which the image shake control unit is disposed,
wherein the complex module comprises a multi-frame and a third lens disposed in the multi-frame,
wherein the multi-frame comprises a barrel frame on one side and a camera actuator including a shaper frame on an other side, and
wherein the shaper frame includes a first frame body, a second frame sidewall extending upwardly from a bottom edge of the first frame body, and a single or a plurality of third frame protrusions protruding from an inner bottom of the first frame body.

18. The camera actuator according to claim 17, wherein the shaper frame further includes a single or a plurality of frame recesses on one side of the second frame sidewall.

* * * * *